(12) United States Patent
Tao et al.

(10) Patent No.: US 9,952,494 B2
(45) Date of Patent: Apr. 24, 2018

(54) VIDEO PROJECTING STRUCTURE, METHOD FOR MANUFACTURING VIDEO PROJECTING STRUCTURE, VIDEO PROJECTING METHOD, AND AUTOMOBILE WINDOW

(71) Applicant: Asahi Glass Company, Limited, Chiyoda-ku (JP)

(72) Inventors: Yukihiro Tao, Chiyoda-ku (JP); Kenta Sekikawa, Chiyoda-ku (JP); Hitoshi Tsujimura, Chiyoda-ku (JP); Kenichi Ebata, Chiyoda-ku (JP); Yuriko Kaida, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/366,745

(22) Filed: Dec. 1, 2016

(65) Prior Publication Data

US 2017/0082915 A1    Mar. 23, 2017

Related U.S. Application Data

(63) Continuation of application No. PCT/JP2015/065792, filed on Jun. 1, 2015.

(30) Foreign Application Priority Data

Jun. 2, 2014 (JP) ................ 2014-113842
Jun. 2, 2014 (JP) ................ 2014-113844

(51) Int. Cl.
*G03B 21/60* (2014.01)
*G03B 21/62* (2014.01)
(Continued)

(52) U.S. Cl.
CPC ............. *G03B 21/62* (2013.01); *G02B 5/02* (2013.01); *G02B 5/0236* (2013.01);
(Continued)

(58) Field of Classification Search
CPC ...................................... G03B 21/60
(Continued)

(56) References Cited

U.S. PATENT DOCUMENTS 6,804,053 B2 * 10/2004 Etori ................ G03B 21/62
                                                    359/453
2003/0214632 A1 * 11/2003 Ma .................. G03B 21/604
                                                    353/31
(Continued)

FOREIGN PATENT DOCUMENTS

CN      103338927 A      10/2013
JP      2005-526283       9/2005
(Continued)

OTHER PUBLICATIONS

International Search Report dated Aug. 11, 2015 in PCT/JP2015/065792, filed on Jun. 1, 2015 ( with English Translation).
Written Opinion dated Aug. 11, 2015 in PCT/JP2015/065792, filed on Jun. 1, 2015.

*Primary Examiner* — Clayton E LaBalle
*Assistant Examiner* — Kevin Butler
(74) *Attorney, Agent, or Firm* — Oblon, McClelland, Maier & Neustadt, L.L.P.

(57) ABSTRACT

A video projecting structure includes a substrate having a visible light transmittance greater than or equal to 5% and less than or equal to 90%, a reflectivity greater than or equal to 5% and less than or equal to 90%, and a front haze less than or equal to 30.

18 Claims, 20 Drawing Sheets

(51) Int. Cl.
    *G02B 5/02*      (2006.01)
    *G02B 5/08*      (2006.01)
    *G09F 19/18*     (2006.01)
    *G03B 21/625*    (2014.01)
    *G03B 21/602*    (2014.01)
    *G03B 21/604*    (2014.01)
    *G03B 21/56*     (2006.01)

(52) U.S. Cl.
    CPC ............. *G02B 5/0284* (2013.01); *G02B 5/08* (2013.01); *G03B 21/60* (2013.01); *G09F 19/18* (2013.01); *G03B 21/56* (2013.01); *G03B 21/602* (2013.01); *G03B 21/604* (2013.01); *G03B 21/625* (2013.01)

(58) Field of Classification Search
    USPC .......................................................... 359/459
    See application file for complete search history.

(56) References Cited

U.S. PATENT DOCUMENTS

| | | | |
|---|---|---|---|
| 2005/0225687 A1* | 10/2005 | Yamauchi | G03B 21/60 349/5 |
| 2006/0098279 A1* | 5/2006 | Yamauchi | G03B 21/56 359/449 |
| 2009/0067057 A1* | 3/2009 | Sprague | G02B 27/0101 359/630 |
| 2014/0104690 A1* | 4/2014 | Sandre-Chardonnal | B32B 17/10 359/599 |
| 2017/0082915 A1* | 3/2017 | Tao | G02B 5/02 |
| 2017/0168294 A1* | 6/2017 | Yamaguchi | G02B 27/0101 |

FOREIGN PATENT DOCUMENTS

| | | |
|---|---|---|
| JP | 2005-326824 | 11/2005 |
| JP | 2006-138938 | 6/2006 |
| JP | 2010-160216 | 7/2010 |
| JP | 2010-539525 | 12/2010 |
| JP | 2014-509963 | 4/2014 |

* cited by examiner

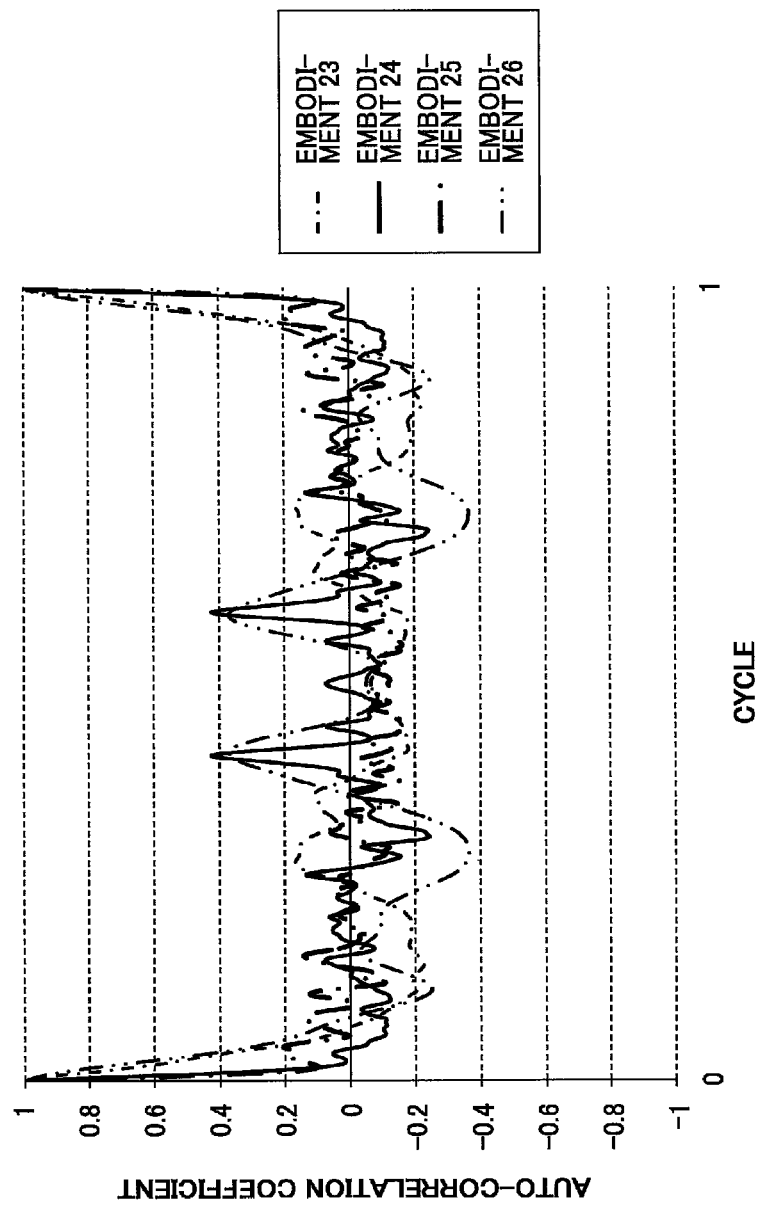

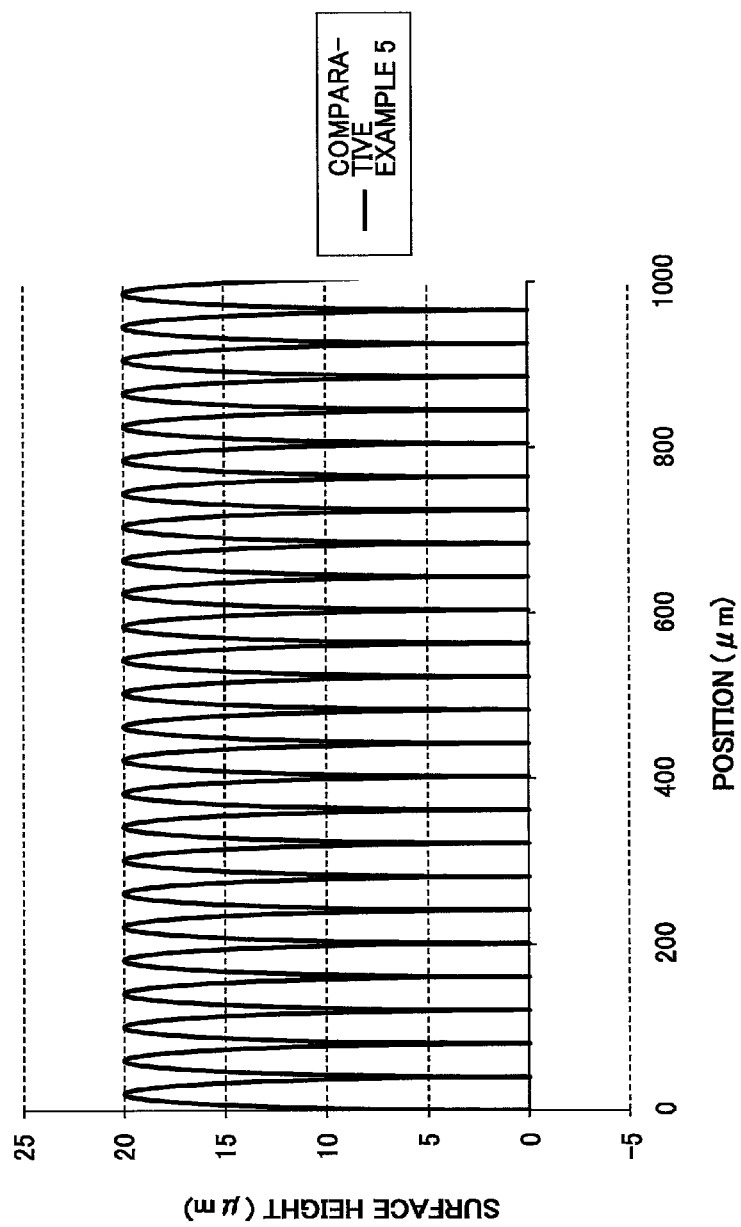

VIDEO PROJECTING STRUCTURE, METHOD FOR MANUFACTURING VIDEO PROJECTING STRUCTURE, VIDEO PROJECTING METHOD, AND AUTOMOBILE WINDOW

CROSS-REFERENCE TO RELATED APPLICATION

This application is a U.S. continuation application filed under 35 USC 111(a) claiming benefit under 35 USC 120 and 365(c) of PCT application PCT/JP2015/065792, filed on Jun. 1, 2015, which claims priority to application Ser. Nos. 2014-113842 and 2014-113844, filed in Japan on Jun. 2, 2014, respectively. The foregoing applications are hereby incorporated herein by reference.

TECHNICAL FIELD

The present invention generally relates to a video projecting structure, a method for manufacturing a video projecting structure, a video projecting method, and an automobile window.

BACKGROUND ART

Normally, a screen that visibly displays video light radiated from a projector is aimed to display the video light projected from the projector. Therefore, a viewer cannot view the opposite side (rear side) through the screen. One example of a screen that allows the rear side to be viewed is a transmitting type screen. Because the transmitting type screen displays a video by transmitting video light projected from the rear side of the screen to the viewer side (front side) of the screen, light from the rear side of the screen can transmit through the screen. Although light can transmit through the transmitting type screen, the viewer may be unable to view the rear side through the screen.

As a reflection type screen that can be viewed from the rear side, there is disclosed a structure in which irregularities are buried by cyclically forming irregularities on a surface of a transparent substrate, depositing a thin metal film on the irregularities, and further supplying a transparent material onto the metal film (see, for example, Patent Document 1).

RELATED ART DOCUMENT

Patent Document

Patent Document 1: Japanese Laid-Open Patent Publication No. 2010-539525

However, the screen having the structure disclosed in Patent Document 1 has poor video visibility due to insufficient video light to be displayed or insufficient brightness of the video when viewing the rear side of the video.

There is a demand for an indoor window capable of projecting video or the like. That is, there is a demand for a video projecting window that can function as a transparent window for enabling outside scenery to be viewed from indoors when no video is projected, and function as a screen for enabling a projected video to be viewed indoors when a video is projected from a projector provided indoors. However, Patent Document 1 does not teach how the reflection type screen can achieve balance between visibility of video and visibility of a background.

An aspect of the present invention provides a video projecting window structure achieving high visibility of a projected video without degrading the visibility of a background image that can be seen through the video projecting window structure. Further, another aspect of the present invention provides a method for manufacturing a video projecting structure that can precisely and inexpensively provide a video projecting window structure achieving high visibility of a projected video without degrading the visibility of a background image that can be seen through the video projecting window structure.

SUMMARY OF THE INVENTION

In order to solve the above-described problems, an embodiment of the present invention provides a video projecting structure includes a substrate having a visible light transmittance greater than or equal to 5% and less than or equal to 90%, a reflectivity greater than or equal to 5% and less than or equal to 70%, and a front haze less than or equal to 20.

BRIEF DESCRIPTION OF DRAWINGS

FIG. 18 is a graph illustrating an autocorrelation coefficient of practical examples 23 to 26;

FIG. 20 is a graph depicting a shape of a surface of a first transparent layer of a fifth comparative example;

DESCRIPTION OF EMBODIMENTS

Figure 1:
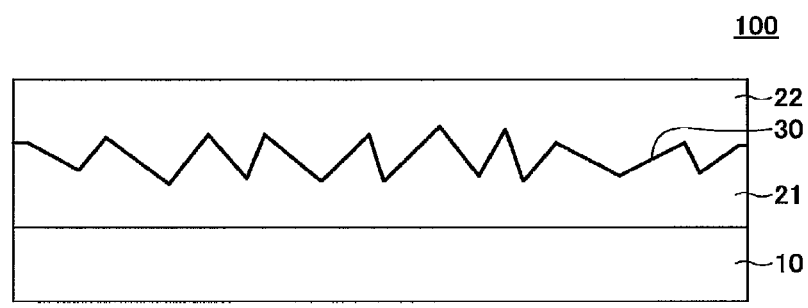
FIG. 1 is a schematic diagram depicting a structure of a video projecting window according to an embodiment of the present invention.

The invention will be described with reference to the accompanying drawings. Throughout the drawings, like components and corresponding configurations are denoted with like reference numerals and further explanation thereof is omitted.

First Embodiment

The video projecting structure according to an embodiment of the present invention has a transmittance that is greater than or equal to 5% and less than or equal to 90%, a reflectivity that is greater than or equal to 5% and less than or equal to 70%, and a front haze that is less than or equal to 20.

The transmittance of visible light of the video projecting structure may be greater than or equal to 10% or greater than or equal to 30%. In this range, visibility of outside scenery is satisfactory. Further, the transmittance of visible light of the video projecting structure may be less than or equal to 80%, less than or equal to 70%, or less than or equal to 60%, so that the video projecting structure can maintain a suitable gain when used as a screen. In order for the video projecting structure to function as a screen, a high screen gain is preferred. The reflectivity of the video projecting structure may be greater than or equal to 9%, greater than or equal to 15%, or greater than or equal to 30%.

The front haze of the video projecting structure may be less than or equal to 15, or less than or equal to 10. From the standpoint of achieving balance with screen characteristics, the front haze of the video projecting structure may be greater than or equal to 0.2, greater than or equal to 0.5, and greater than or equal to 0.8. The "front haze" refers to the percentage of a portion of transmitted light deviating 2.5 degrees or more from the incident light axis on the video projecting structure.

The rear haze of the video projecting structure may be greater than or equal to 5. From the standpoint of transparency, the rear haze of the video projecting structure may be less than or equal to 90, or less than or equal to 80. The "rear haze" refers to the percentage of a portion of reflection light deviating 2.5 degrees or more from the specular reflection light reflected from the video projecting structure.

The video projecting structure is suitable for use in an environment where external light exists in the surroundings. Thus, a satisfactory visibility enabling viewing of the projected video and the background is preferred even in an environment where the illuminance in the sight range of the viewer viewing the video projecting structure is greater than or equal to 100 lux. In order to do so, the rear haze is preferred to be greater than the front haze.

In a case where light is incident on the surface of the video projecting structure at an angle of 45 degrees, the ratio of the intensity of light scattering backward in a normal direction of the video projecting structure to the intensity of light scattering frontward in the normal direction of the video projecting structure (Ib/If) may be greater than or equal to 0.8, and more preferably greater than 1. The external light that is obliquely incident on the video projecting structure is preferred not to be visible by the viewer. Because preventing the incident light from being radiated to the side where video light is not incident on the video projecting structure is important for transparency, the above-described parameters are to be appropriately maintained.

As for the parameter for achieving balance between transparency and screen gain, a value obtained by dividing the ratio of the intensity of light scattering backward in a normal direction of the video projecting structure and the intensity of light scattering frontward in the normal direction of the video projecting structure (Ib/If) in a case where light is incident on the surface of the video projecting structure at an angle of 45 degrees with the value of the front haze is preferably greater than or equal to 0.1, and more preferably greater than or equal to 0.2. A light source that radiates visible light may be used for measuring the parameter. More specifically, standard illuminants A, B, C, D, D65, or a light source that reproduces light in the spectra of these illuminants may be used.

Further, as the parameter for achieving balance between transparency and screen gain, it is preferable for the "(intensity of rear scattering light of 45 degree incident light/ intensity of front scattering light of 45 degree incident light)×(rear haze/front haze)" a value obtained by an expression "in a case where light is incident on the surface of the video projecting structure at an angle of 45 degrees to be greater than or equal to 5, and more preferably greater than or equal to 10.

If the above-described optical conditions are satisfied, the video projecting window can achieve balance between video visibility and background visibility even in an environment where external light exists in the surroundings. The video projecting window can be used in a case where direct sunlight exists as the external light, a case of clear weather without direct sunlight, or a case where the light indoors is greater than or equal to 100 lux.

Because the value of "rear scattering light of 45 degree incident light/front scattering light of 45 degree incident light" is large, the environment of the side that does not project a video is preferred to be brighter than relative to the side that projects the video or preferred to be outdoors.

As one embodiment of the video projecting structure of the present invention, a video projecting window 100 is described below with reference to FIG. 1. The video projecting window 100 of this embodiment includes a transparent substrate 10, a first transparent layer 21 provided on the transparent substrate 10 and having irregularities formed on its surface, a reflection film 30 provided on the surface of the first transparent layer 10 on which the irregularities are formed, and a second transparent layer 22 provided on the reflection film 30. The second transparent layer 22 is formed on the reflection film 30 in a manner burying the irregularities.

The transparent substrate 10 may be formed of glass or a transparent resin. The glass forming the transparent substrate 10 is preferably soda-lime glass or alkali-free glass. Alternatively, the glass forming the transparent substrate 10 may be, for example, chemically strengthened glass or hard coating glass for improving durability. The transparent resin forming the transparent substrate 10 is preferably, for example, a polycarbonate film, a PET (polyethylene terephthalate) film, a PEN (polyethylene naphthalate) film, a cyclo olefin polymer film, or a polyester film. The transparent substrate 10 is preferably a substrate having no birefringence.

The thickness of the transparent substrate 10 may be selected to be a thickness that retains durability of the substrate. The thickness of the transparent substrate 10 may be greater than or equal to 0.01 mm, greater than or equal to 0.05 mm, or greater than or equal to 0.1 mm. Further, the thickness of the transparent substrate 10 may be less than or equal to 10 mm, less than or equal to 5 mm, less than or equal to 0.5 mm, less than or equal to 0.3 mm, or less than or equal to 0.15 mm.

The first transparent layer 21 is preferably a transparent resin layer a photocurable resin such as acrylic resin, epoxy resin, a thermosetting resin, or a thermoplastic resin such as polycarbonate. To prevent the function of the video projecting window 100 from degrading and to maintain the transparency of the video projecting window 100, the yellow index of the transparent resin is preferably less than or equal to 10, and more preferably less than or equal to 5. The transmittance of the first transparent layer 21 is preferably greater than or equal to 50%, more preferably greater than or equal to 75%, and yet more preferably greater than or equal to 90%.

The second transparent layer 22 is preferably a transparent resin layer. The transparent resin of the second transparent layer 22 may be the same as the transparent resin of the first transparent layer 21. Although the material of the second transparent may be the same as or different from the material of the first transparent layer 21, the first and second transparent layers are preferred to be formed of the same material. The transmittance of the second transparent layer 22 is preferably greater than or equal to 50%, more preferably greater than or equal to 75%, and yet more preferably greater than or equal to 90%.

The thickness of each of the first and second transparent layers 21, 22 except for the part having the irregularities may be greater than or equal to 0.5 µm and less than or equal to 50 µm.

The reflection film 30 may be single or multiple layers formed of metals, dielectrics, or a combination thereof. A portion of light incident on the reflection film 30 transmits through the reflection film 30 whereas another portion of the incident light is reflected by the reflection film 30. Therefore, the reflection film 30 may be formed of any one of metal, a metal oxide, or a metal nitride. The reflection film 30 is preferably formed of a metal material including aluminum (Al) or silver (Ag). The reflection film 30 is preferred to include a metal thin film or include a film configuration having an oxide film, a metal thin film, and an oxide film layered in this order. The thickness of the metal thin film is preferably less than or equal to 1 mm to 100 nm, and more preferably less than or equal to 4 nm to 25 nm.

Each of the first and second transparent layers 21, 22 preferably includes a material exhibiting a front haze less than or equal to 20 and more preferably less than or equal to 15 in a case where the above-described materials are processed on a flat plate having each of their average thicknesses. The absorbance in the visible range is preferably "$\exp(-2\pi A \times |k_1 - k_2|/\lambda) > 0.2\ 5$" in a case where "$k_1$" and "$k_2$" represent the extinction coefficients of the first and second transparent layers 21, 22, "A" represents the arithmetic average roughness (Ra) of the irregular shapes formed on the first and second transparent layers 21, 22, and "$\lambda$" represents the visible light wavelength. The irregular shapes of the first and second transparent layers 21, 22 may include, for example, random irregularities, a lens array, a lens array having different shaped lenses, a blazed hologram, or a pseudo-blazed hologram. Particularly, random irregularities are preferred to be the irregular shapes of the first and second transparent layers 21, 22 because the random irregularities allow easy area-enlargement because a film-like mold can be used. Further, the average roughness Ra of the irregular shapes of the first and second transparent layers 21, 22 preferably satisfies "Ra$\Delta$n/wavelength of video light <0.5" in a case where "$\Delta$n" represents the difference of the refractive indices of the first transparent layer 21 and the second transparent layer 22 having irregularities provided therebetween.

According to the video projecting window 100 of this embodiment, the difference of refractive indices of adjacent layers is preferably less than or equal to 0.2 because the reflectivity at the interface between the adjacent layers can be controlled to be less than or equal to 0.5% if the difference of refractive indices of adjacent layers is less than or equal to 0.2. Further, it is more preferable for the difference of refractive indices of adjacent layers to be less than or equal to 0.1 because the reflectivity at the interface between the adjacent layers can be controlled to be approximately 0.1% if the difference of refractive indices of adjacent layers is less than or equal to 0.1.

Further, the value of the difference of refractive indices of the first transparent layer 21 and the second transparent layer 22 is preferably less than or equal to 1 in a case of "$\Delta n \times Ra/\lambda$" in which "Ra" represents the roughness value of the irregularities formed on the first transparent layer 21, "$\lambda$" represents the visible light wavelength, and "$\Delta n$" represents the absolute value of the difference of refractive indices of the first transparent layer 21 and the second transparent layer 22. Considering the reflectivity at the interface, the transmitted scattering light, and the degree of freedom of the shapes of the irregularities, the difference of refractive indices of the first transparent layer 21 and the second transparent layer 22 is preferably less than or equal to 0.1, more preferably less than or equal to 0.05, and yet more preferably 0.02. Further, in a case where the first and second transparent layers 21, 22 are formed of organic resin, the volume ratio of the double or triple bond of resins included in each of the layers is preferred to range from 50% to 150%. Further, the ratio of the density of the materials in each layer of the first and second transparent layers 21, 22 is preferred to range from 80% to 120%.

Figure 2:
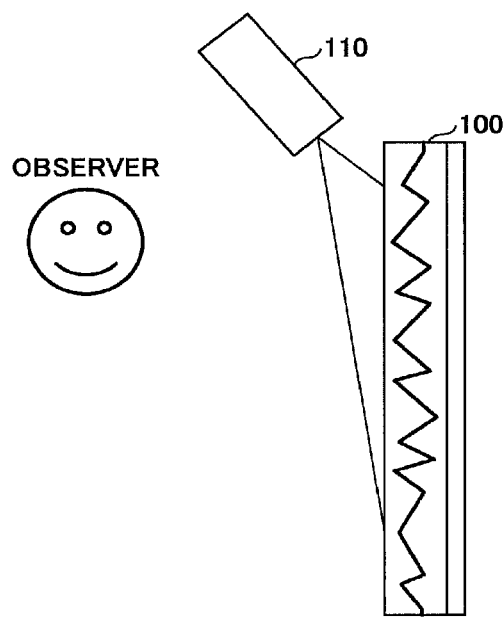
FIG. 2 is a schematic diagram for illustrating a video projecting window according to an embodiment of the present invention.

The video projecting window 100 of this embodiment is a reflection type video projecting window. As illustrated in FIG. 2, the video projection window 100 is for enabling video reflected from the video projecting window 100 to be viewed by a viewer on the opposite side of the projector 100 by projecting the video to the video projecting window 100 from the projector 110.

Next, a method for manufacturing a video projecting window according to an embodiment of the present invention is described with reference to FIGS. 3A-3C, FIG. 4A, and FIG. 4B.

Figure 3A:
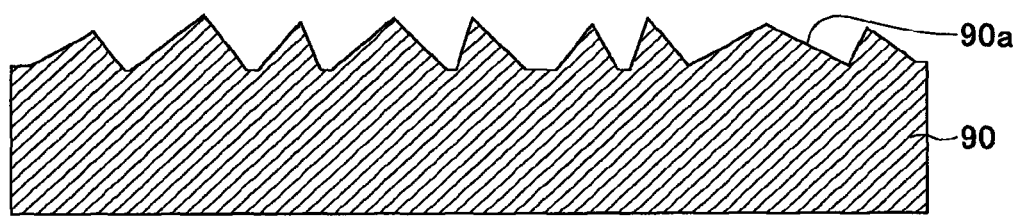
FIGS. 3A to 3C are schematic diagrams depicting a process (1) of a method for manufacturing a video projecting window according to an embodiment of the present invention.

First, a mold 90 having irregularities 90a formed on its surface is prepared as illustrated in FIG. 3A. The mold 90 may be a resin film having irregularities formed on its surface. The mold 90 may be a black or white film having a matted or a glossy surface, a mold releasing film, or a metal mold having irregularities formed on its surface. Regarding the characteristics of the surface of the mold 90, the surface of the mold 90 is preferred to exhibit little change of glossiness in an in-plane direction. In a case where the proportion of glossiness between two different areas in the in-plane direction is measured, the proportion is preferred to be within a range of 50% to 200%. The film 90 having irregularities 90a formed on its surface is preferred not to be subjected to an easy adhesive process. The film or mold having irregularities formed on its surface may be a film or mold in which the irregularities are formed by, for example, performing a cutting process, a dry-etching process, a wet etching process, a sandblasting process, a surface molding process by extrusion, utilizing a surface structure created when molding a mixture containing fine particles, or applying a self-assembling material on the surface formed with irregularities. The material of the metal mold may be, for example, a nickel (Ni) material, a stainless material, a copper (Cu) material, a quartz material, or a glass material. Further, a releasing process may be performed on the surface formed with irregularities.

Figure 3B:
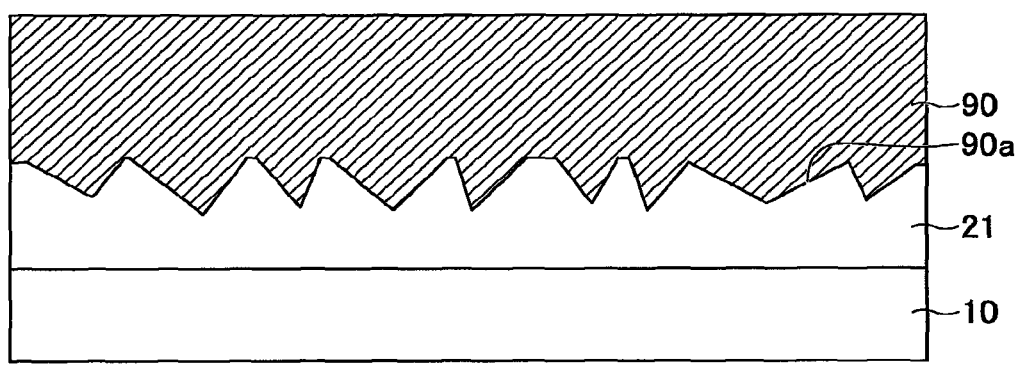

Then, as illustrated in FIG. 3B, the transparent substrate 10 such as a glass substrate is prepared, and a resin material such as ultraviolet (UV) curable resin is applied on the transparent substrate 10 for forming the first transparent layer 21. The resin material may be applied by, for example, die-coating, spin-coating, inkjet coating, or spray coating. Then, the mold 90 is placed on the transparent substrate 10 coated with the UV curable resin. The mold 90 is placed, so that the surface of the mold 90 formed with the irregularities 90a is on top of the UV curable resin. Then, the UV curable resin is cured by radiating ultraviolet (UV) light of 200 mJ to 10000 mJ on the UV curable resin. Thereby, the first transparent layer 21 is formed. In a case of forming the first transparent layer 21 with a thermosetting resin, a thermosetting resin is cured by heating after the mold 90 is placed on the thermosetting resin. Further, in a case of forming the first transparent layer 21 with a thermoplastic resin, a thermoplastic resin is solidified by cooling after placing the mold 90 on the thermoplastic resin and heating the thermoplastic resin.

Figure 3C:
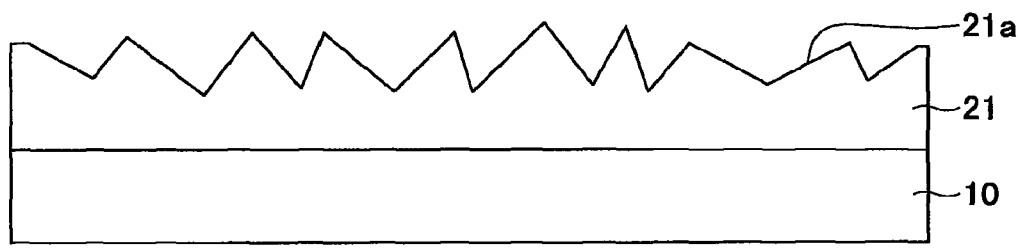

Then, the mold 90 is peeled from the first transparent layer 21 as illustrated in FIG. 3C. Thereby, the surfaces of the irregularities 21a formed on the surface of the first transparent layer 21 become exposed.

Figure 4A:
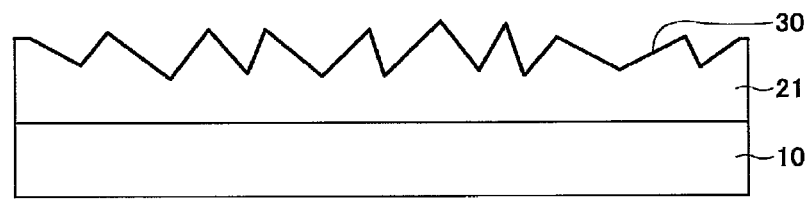
FIGS. 4A and 4B are schematic diagrams depicting a process (2) of a method for manufacturing a video projecting window according to an embodiment of the present invention.

Then, as illustrated in FIG. 4A, the reflection film 30 is formed on the surface of the first transparent layer 21 on which the irregularities 21a are formed. The reflection film 30 is formed by depositing an aluminum (Al) film on the surface formed with the irregularities 21a. The reflection film 30 may be deposited by vapor evaporation or sputtering.

Further, the reflection film 30 is preferably formed with a thickness that is less than or equal to 1 nm to 100 nm, and more preferably 4 nm to 25 nm. The reflection film 30 is preferably formed with a reflectivity that is greater than or equal to 5%, more preferably greater than or equal to 15%, and yet more preferably greater than or equal to 30%. Further, the reflection film 30 is preferred not to abruptly change depending on color. The ratio of the common logarithm of the reflectivity of each of RGB is preferred to range from 0.5 to 2 in a case where the representative wavelength of RGB is 630 nm, 530 nm, and 465 nm, respectively.

Figure 4B:
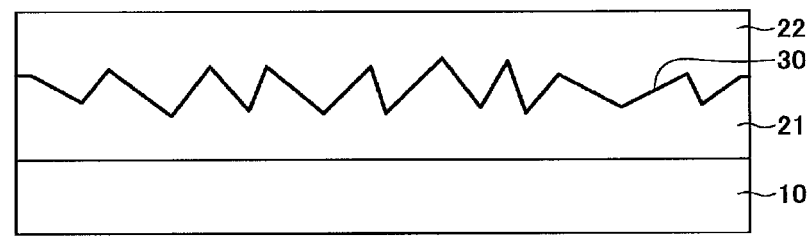
Figure 5:
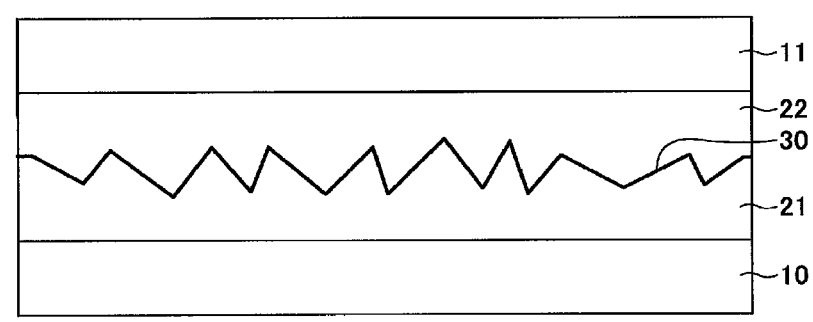
FIG. 5 is a schematic diagram depicting a first modified example of a video projecting window according to an embodiment of the present invention.

Then, as illustrated in FIG. 4B, the second transparent layer 22 is formed on the reflection film 30. More specifically, ultraviolet (UV) curable resin for forming the second transparent resin 22 is die-coated on the reflection film 30 formed on the irregularities 21a of the first transparent layer 21. Then, the UV curable resin is cured by radiating ultraviolet (UV) light on the UV curable resin. Thereby, the second transparent layer 22 is formed. Note that the second transparent layer 22 may also be formed with a thermosetting resin or a thermoplastic resin.

Further, each of the first and second transparent layers 21, 22 is preferred to have a thickness greater than or equal to 0.5 µm except for the part of the irregularities. Considering that the first and second transparent layers 21, 22 are formed by a roll-to-roll process, the thickness of each of the first and second transparent layers 21, 22 is preferably less than or equal to 50 µm. Further, the thickness of each of the first and second transparent layers 21, 22 is preferably less than or equal to two times the average roughness (Ra) of the irregularities because such thickness not only achieves cost reduction owing to the reduction in the amount of resin but also suppresses the formation of sinks or the like during molding.

The video projecting window 100 may have the below-described configuration formed on the transparent substrate 10. The video projecting window 100 may include a scattering material that is layered on a half-mirror. The video projecting window 100 may include a volume hologram to reflect, deflect, and diffuse light. The video projecting window 100 may include a kinoform hologram or other configurations having a surface formed with irregularities or a reflection film formed on such surface to reflect, deflect, and diffuse light. The video projecting window 100 may include a configuration using a cholesteric liquid crystal or a polymer cholesteric liquid crystal. The cholesteric liquid crystal may be aligned and formed on an irregular surface. The polymer cholesteric liquid crystal may include a surface on which irregularities are formed by etching or the like. The cholesteric liquid crystal may include a liquid crystal layer formed on a horizontally and vertically aligned substrate. A cholesteric liquid crystal added with a surfactant may be applied on a substrate and form the substrate with a vertically aligned surface or a surface with reduced crystal alignment.

Next, a video projecting structure according to another embodiment of the present invention is described.

Figure 6:
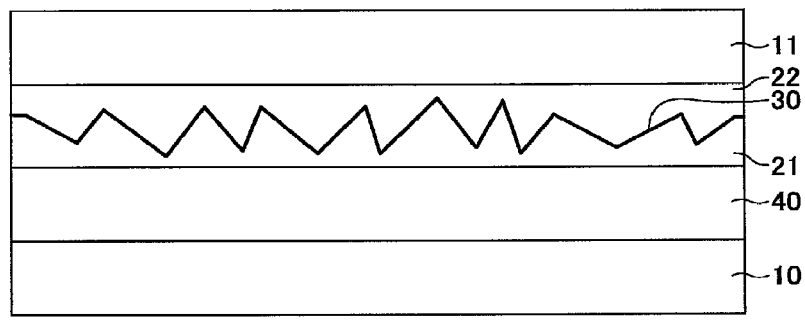
FIG. 6 is a schematic diagram depicting a second modified example of a video projecting window according to an embodiment of the present invention.

The video projecting structure of the embodiment illustrated in FIG. 6 has a structure using two transparent substrates. More specifically, the video projecting structure includes a structure in which the transparent substrate 11 is laminated on the second transparent layer 22 illustrated in FIG. 1. The material of the transparent substrate 11 may be the same as or different from the material of the transparent substrate 10. The transparent substrate 11 is preferred to be formed with the same material and thickness as the preferred material and thickness described above.

The video projecting structure of this embodiment has the first transparent layer 21, the reflection film 30, and the second transparent layer 22 formed on the transparent film 40 as illustrated in FIG. 6.

As illustrated in FIG. 6, the video projecting structure of this embodiment includes the transparent film 40 on which the first transparent layer 21, the reflection film 30, and the second transparent layer 22 are formed. The transparent substrate 10 is laminated on the side of the transparent film 40 whereas the transparent substrate 11 is laminated on the side of the second transparent layer 22. The video projecting structure of this film allows the first transparent layer 21, the reflection film 30, and the transparent layer 22 to be formed on the transparent film 40 instead of forming the first transparent layer 21, the reflection film 30, and the transparent layer 22 directly on the transparent substrate 10 formed of glass or the like. Therefore, the video projecting structure can be manufactured with an inexpensive manufacturing method such as a roll-to-roll method. The transparent film 40 and the transparent substrate 10 are illustrated in FIG. 6 as separates for the sake of convenience. However, the transparent film 40 and the transparent substrate 10 may be an integrated body. Further, the first transparent layer 21 may be the same as the transparent film 40 and formed from a single material. That is, irregularities of the first transparent layer 21 may be formed by roughening the surface of the transparent film 40 by performing, for example, a sandblasting process.

The transparent film 40 may be a transparent resin film or a thin glass film. The transparent film 40 preferably has a thickness allowing a roll-to-roll process to be used. The thickness of the transparent film 40 is preferably 0.01 mm to 0.5 mm, more preferably 0.05 mm to 0.3 mm, and yet more preferably less than or equal to 0.15 mm.

Figure 7:
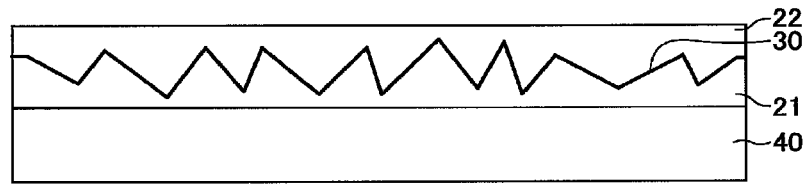
FIG. 7 is a schematic diagram depicting a third modified example of a video projecting window according to an embodiment of the present invention.

The video projecting structure of the embodiment illustrated in FIG. 7 has the first transparent layer 21, the reflection film 30, and the second transparent layer 22 formed on the transparent film 40. Because the video projecting structure of this embodiment has a thin structure in which the first transparent layer 21, the reflection film 30, and the second transparent layer 22 formed on the transparent film 40 are formed on the transparent film 40, lamination using an adhesive or changing of shape can be performed. Thus, the video projecting structure of this embodiment suited to be used as a material for forming a video projecting window or the like that has a curved surface.

Figure 8:
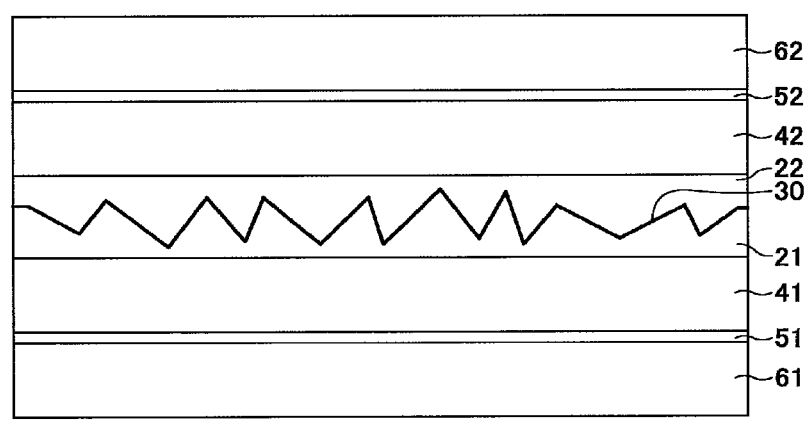
FIG. 8 is a schematic diagram depicting a fourth modified example of a video projecting window according to an embodiment of the present invention.

The video projecting structure of the embodiment illustrated in FIG. 8 is a video projecting window having a structure of a laminated glass. More specifically, a structure having the first transparent film 41 and the first glass substrate 61 adhered to each other by way of an adhesive layer 51 is laminated to a first transparent layer 21 side of a structure including the first transparent layer 21, the reflection film 30, and the second transparent layer 22. Further, a structure having the second transparent film 42 and a second glass substrate 62 adhered to each other by way of an adhesive layer 52 is laminated to a second transparent layer 22 side of the a structure including the first transparent layer 21, the reflection film 30, and the second transparent layer 22. Alternatively, the second glass substrate 62 may be adhered to the second transparent layer 22 via the adhesive layer 52 without providing the second transparent film 42. In the video projecting structure of this embodiment, the adhesive layer 51, 52 are formed of, for example, an adhesive such as EVA (Ethylene-vinyl acetate) resin, PVB (Poly vinyl butyral) resin, or an acrylic adhesive, or a UV curable resin.

Note that the adhesive layers 51, 52 are for adhering the first glass substrate 61 to the first transparent film 41 and adhering the second glass substrate 62 to the second transparent film 42. The adhesive layers 51, 52 may include a thermoplastic resin compound having a thermoplastic resin as its main component. The thickness of each of the adhesive layers 51, 52 is not limited in particular. For example, the thickness of each of the adhesive layers 51, 52 is preferably 0.01 mm to 1.5 mm, and more preferably, 0.05 mm to 0.5 mm.

The thermoplastic resin used for the adhesive layers 51, 52 may be a thermoplastic resin that is conventionally used for an adhesive purpose. For example, plasticized polyvinyl acetal resin, plasticized polyvinyl chloride resin, saturated polyester resin, plasticized saturated polyester resin, polyurethane resin, plasticized polyurethane resin, ethylene-vinyl acetate copolymer resin, ethylene-ethyl acrylate copolymer resin may be used.

Figure 9:
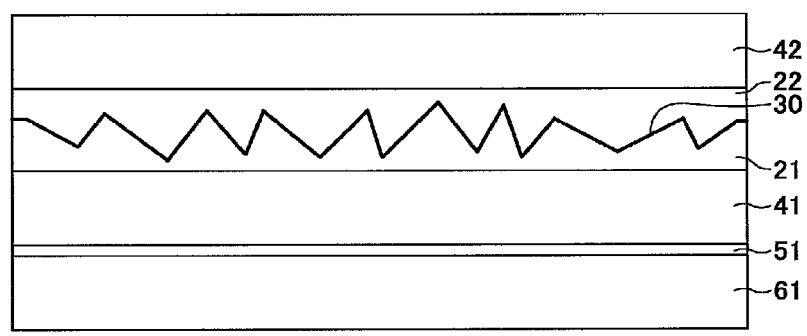
FIG. 9 is a schematic diagram depicting a fifth modified example of a video projecting window according to an embodiment of the present invention.

In the video projecting window of the embodiment illustrated in FIG. 9, the glass substrates used in the video projecting window of FIG. 8 may be formed into a single substrate. More specifically, a structure having the first transparent film 41 and the first glass substrate 61 adhered to each other by way of an adhesive layer 51 is laminated to a first transparent layer 21 side of a structure including the first transparent layer 21, the reflection film 30, and the second transparent layer 22 whereas the second transparent film 42 is laminated to the second transparent layer 22. Alternatively, the video projecting window of this embodiment may be a structure without the second transparent film.

The video projecting structure of the above-described embodiment not only can be used as a reflection type screen but can also prevent unevenness of color due to light diffraction or degrading of visibility in which light diffraction causes rainbow color to appear at the edge part of the image transmitted through the video projecting window. That is, the video projecting structure of the above-described embodiment can suppress the occurring of a phenomenon of shades of color being changed depending on the direction or position of viewing the video projecting window, or the direction of the light incident on the video projecting window, and prevent splitting of a transmitted background. Accordingly, the video projecting window of the above-described embodiments can serve as a window having the properties of satisfactory visibility of background and satisfactory color reproduction of background and projected images, and no distraction of view.

Second Embodiment

As one embodiment of the video projecting structure of the present invention, a video projecting window 100 is described below with reference to FIG. 1. The video projecting window 100 of this embodiment includes a transparent substrate 10, a first transparent layer 21 provided on the transparent substrate 10 and having random irregularities formed on its surface, a reflection film 30 provided on the surface of the first transparent layer 10 on which the random irregularities are formed, and a second transparent layer 22 formed on the reflection film 30. The second transparent layer 22 is formed on the reflection film 30 in a manner burying the random irregularities.

The transparent substrate 10 may be formed of glass or a transparent resin. The glass forming the transparent substrate 10 is preferably soda-lime glass or alkali-free glass. Alternatively, the glass forming the transparent substrate 10 may be, for example, chemically strengthened glass or hard coating glass for improving durability. The transparent resin forming the transparent substrate 10 is preferably, for example, a polycarbonate film, a PET (polyethylene terephthalate) film, a PEN (polyethylene naphthalate) film, a cyclo olefin polymer film, or a polyester film. The transparent substrate 10 is preferably a substrate having no birefringence. For example, a cyclo olefin polymer film or a PEN film may be used as a film having little birefringence.

The thickness of the transparent substrate 10 may be selected to be a thickness that retains durability of the substrate. For example, the thickness of the transparent substrate 10 may be greater than or equal to 0.01 mm, greater than or equal to 0.05 mm, or greater than or equal to 0.1 mm. Further, the thickness of the transparent substrate 10 may be less than or equal to 10 mm, less than or equal to 5 mm, less than or equal to 0.5 mm, less than or equal to 0.3 mm, or less than or equal to 0.15 mm.

The first transparent layer 21 is preferably a transparent resin layer a photocurable resin such as acrylic resin, epoxy resin, a thermosetting resin, or a thermoplastic resin. To prevent the function of the video projecting window 100 from degrading and to maintain the transparency of the video projecting window 100, the yellow index of the transparent resin is preferably less than or equal to 10, and more preferably less than or equal to 5. The transmittance of the first transparent layer 21 is preferably greater than or equal to 50%, more preferably greater than or equal to 75%, and yet more preferably greater than or equal to 90%. Note that the term "transmittance in visible light" refers to the transmittance that is measured by using a D-line (wavelength: 589 nm).

The second transparent layer 22 is preferably a transparent resin layer. The transparent resin of the second transparent layer 22 may be the same as the transparent resin of the first transparent layer 21. Although the material of the second transparent may be the same as or different from the material of the first transparent layer 21, the first and second transparent layers are preferred to be formed of the same material. The transmittance of the second transparent layer 22 is preferably greater than or equal to 50%, more preferably greater than or equal to 75%, and yet more preferably greater than or equal to 90%.

The thickness of each of the first and second transparent layers 21, 22 except for the part having the irregularities may be greater than or equal to 0.5 μm and less than or equal to 50 μm.

The reflection film 30 may be single or multiple layers formed of metals, dielectrics, or a combination thereof. A portion of light incident on the reflection film 30 transmits through the reflection film 30 whereas another portion of the incident light is reflected by the reflection film 30. Therefore, the reflection film 30 may be formed of one or more materials selected from a group including metal, a metal oxide, and a metal nitride. The reflection film 30 is preferably formed of a metal material including aluminum (Al) or silver (Ag). The reflection film 30 is preferred to include a metal thin film or include a film configuration having an oxide film, a metal thin film, and an oxide film layered in this order. The thickness of the metal thin film is preferably less than or equal to 1 nm to 100 nm, and more preferably less than or equal to 4 nm to 25 nm. In a case where the thickness of the metal thin film is in this range, the reflection film can be used without impeding the function attained by the average roughness (Ra) of the random irregularities formed on the surface of the first transparent layer 21.

Next, the random irregularities formed on the surface of the first transparent layer 21 of the video projecting window of this embodiment is described. The height and depth in each area of the irregularities are random. Note that the term "random" signifies that the values of the distribution of the coordinates of each area of the irregularities are random numbers or numbers having high randomness being close to random numbers. It is, however, to be noted that the irregularities may have similarity such as having some degree of similarity of shape.

The random irregularities are to be designed with a concept different from designing an ordinary screen. In a case of designing an ordinary white screen, the shape of the surface of the screen is determined on the premise that scattering occurs inside the screen. However, the video projecting structure of this embodiment is to function as a screen that provides practically sufficient viewing angle by reflecting and scattering light based only on the shapes of the irregularities. At the same time, the screen is to attain a transparency that balances the visibility of a projected image and an image of an image in the background image. In order to do so, the shapes of the irregularities are to be defined.

Figure 10:
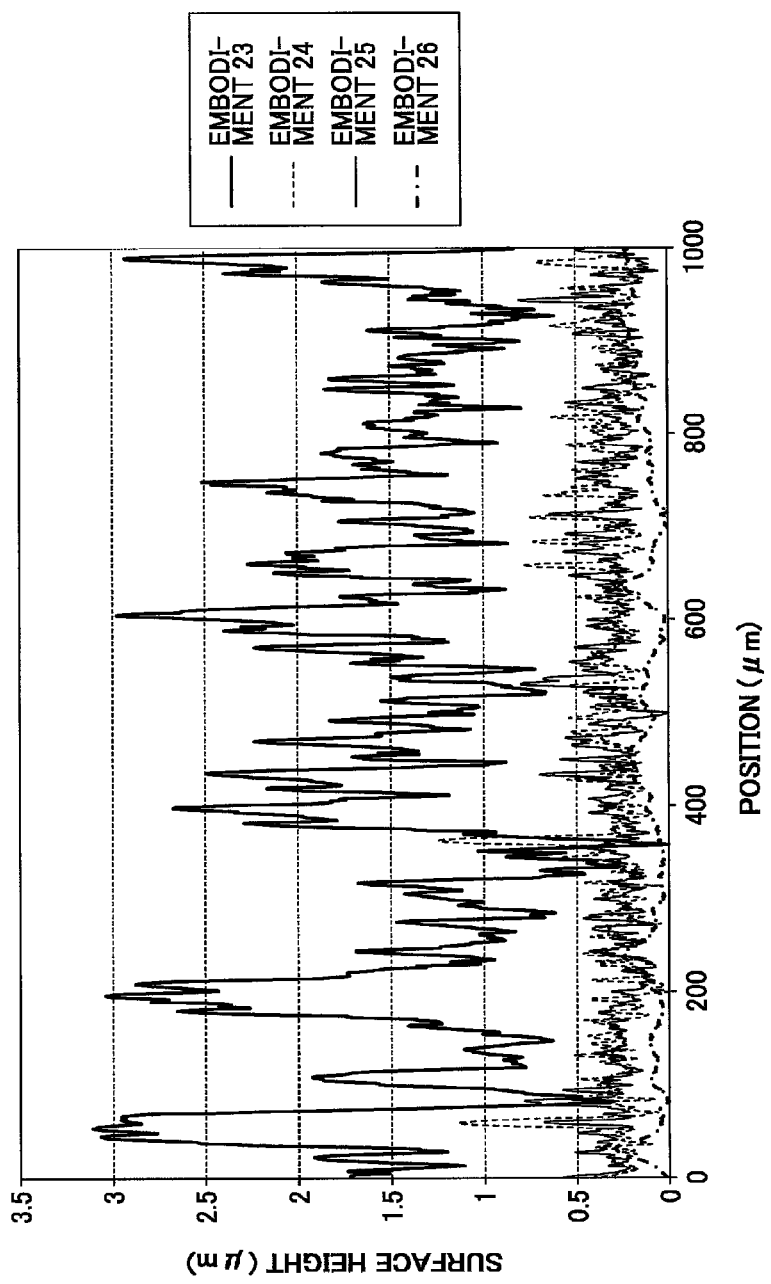
FIG. 10 is a schematic diagram depicting a shape of a surface of a first transparent layer according to an embodiment of the present invention.

FIG. 10 is a graph for illustrating the shape of the surface of the first transparent layer 21 of the below-described practical examples. The average roughness (Ra) of the random irregularities formed on the surface of the first transparent layer 21 is preferably 0.01 μm Ra≤20 μm, more preferably, 0.1 μm Ra≤10 μm, and yet more preferably 0.1 μm Ra≤3 μm. Thereby, the viewing angle of the projected image is wide, the projected image can be viewed without directly seeing specular reflection, and the graininess due to irregularities can be suppressed. Note that the average roughness (Ra) may differ depending on orientation. In a case of viewing the background the components of the video projecting structure of this embodiment of the present invention, the structure of the video projecting structure can be preventing from obstructing the view of the background by setting the average roughness (Ra) of the random irregularities formed on the surface of the first transparent layer 21 to be less than 3 μm. Further, by setting the average roughness to be 10 μm≤Ra≤20 μm, a wide viewing angle with low haze can be obtained even where the frequency of a single cycle of the random irregularities is reduce to be less than or equal to 1 μm because a large scattering angle can be obtained.

Further, the maximum value of the PV (Peak-to-Valley) of the random irregularities formed on the surface of the first transparent layer 21 is less than or equal to 50 μm, and preferably less than or equal to 25 μm. This range is preferable because the shapes of the random irregularities cannot be seen with the naked eye when the maximum value of the PV (Peak-to-Valley) of the random irregularities formed on the surface of the first transparent layer 21 is in this range. Note that "PV" is the average obtained by dividing a distance between a bottom valley in-between a single irregularity and an intersecting point (a point where a line extending perpendicularly from each bottom valley to a main surface of the first transparent layer 21 intersects a line extending from a peak of the irregularity in parallel with the surface of the first transparent layer 21) with 2.

In a case of measuring the height of the irregularities formed on the surface of the first transparent layer 21 and assuming that the measured height is a single cycle of PV values, the median of the measured height is preferably greater than or equal to 0.01 μm, and more preferably greater than or equal to 0.02 μm. Further, the median of the measured height is preferably less than or equal to 0.01 μm, and more preferably less than or equal to 50 μm.

Further, the height (PV) of the random irregularities, the cycle (a distance from a given peak of a convex of an irregularity to a peak of a convex of an adjacent irregularity) of the random irregularities, and the aspect ratio of the random irregularities are preferred to be in a certain range, respectively.

Figure 11:
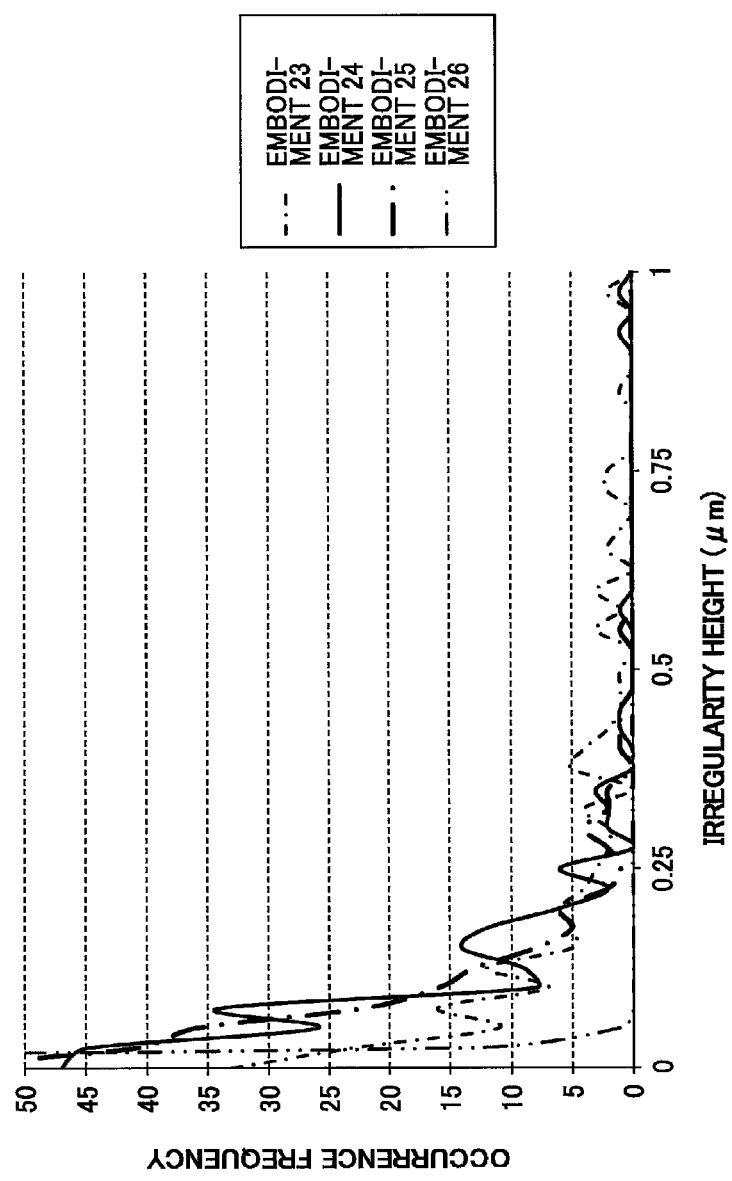
FIG. 11 is a graph depicting a correlation between an irregularity height and an occurrence frequency of practical examples 23 to 26.

FIG. 11 is a graph for illustrating the relationship between the height of the irregularities and the frequency of occurrence of the irregularities of the below-described practical examples. According to the frequency distribution between the height of the irregularities and the frequency of occurrence illustrated in FIG. 11, the value of the frequency of the height corresponding to the peak or the value of the frequency of the height corresponding to half of the median value is preferred to be far from the height of the peak or the height of the median, so that rainbow unevenness can be suppressed. At least one of the value of the frequency of the height corresponding to the peak or the value of the frequency of the height corresponding to half of the median value is preferably less than or equal to or greater than 80% of the peak value, and more preferably greater than or equal to 120%, and yet more preferably less than or equal to less than or equal to 50% or greater an 200%.

The width of the peak among the frequency distribution of the widths of the random irregularities formed on the first transparent layer 21 is preferably greater than or equal to 1 μm. This is because the wavelength of light can increase and lead to improvement of the scattering effect of reflected light. Further, the width of the peak among the frequency distribution of the widths of the random irregularities formed on the first transparent layer 21 is preferably less than or equal to 50 μm, and more preferably less than or equal to 20 μm. This is because patterns can be prevented from being visible with the naked eye.

Figure 12:
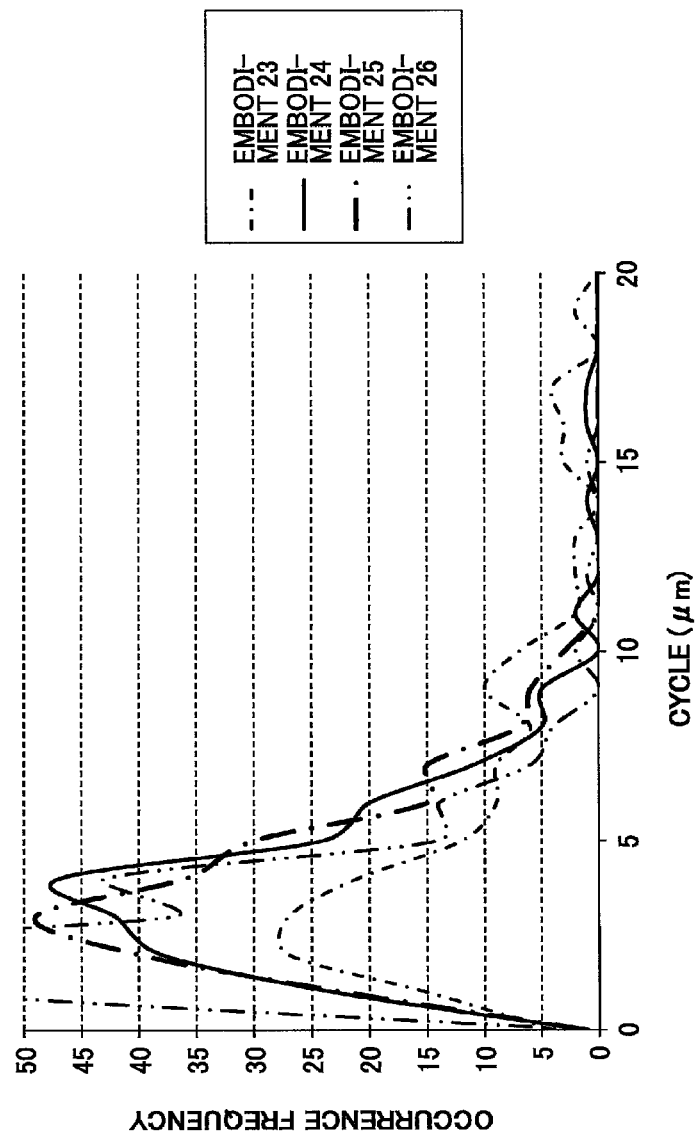
FIG. 12 is a graph depicting a correlation between a cycle and an occurrence frequency of practical examples 23 to 26.

FIG. 12 is a graph for illustrating the relationship between the cycles and the frequency of occurrence of the below-described practical examples. In the frequency distribution of the random irregularities formed on the surface of the first transparent layer 21, the value of one half of the degree of the cycle of peaks is preferably in a range of 80% or less to 120% or more, and more preferably in a range of 50% or less to 200% or more. This is because rainbow unevenness can be suppressed.

Figure 13:
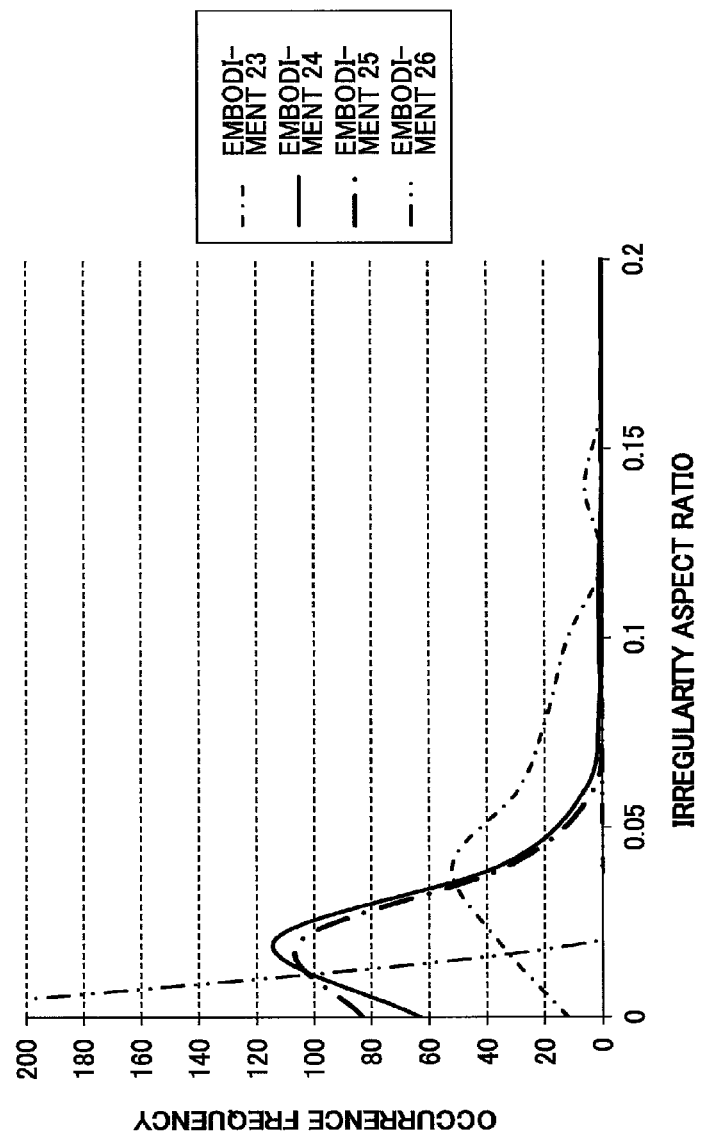
FIG. 13 is a graph depicting a correlation between an irregularity aspect ratio and an occurrence frequency of practical examples 23 to 26.
Figure 14:
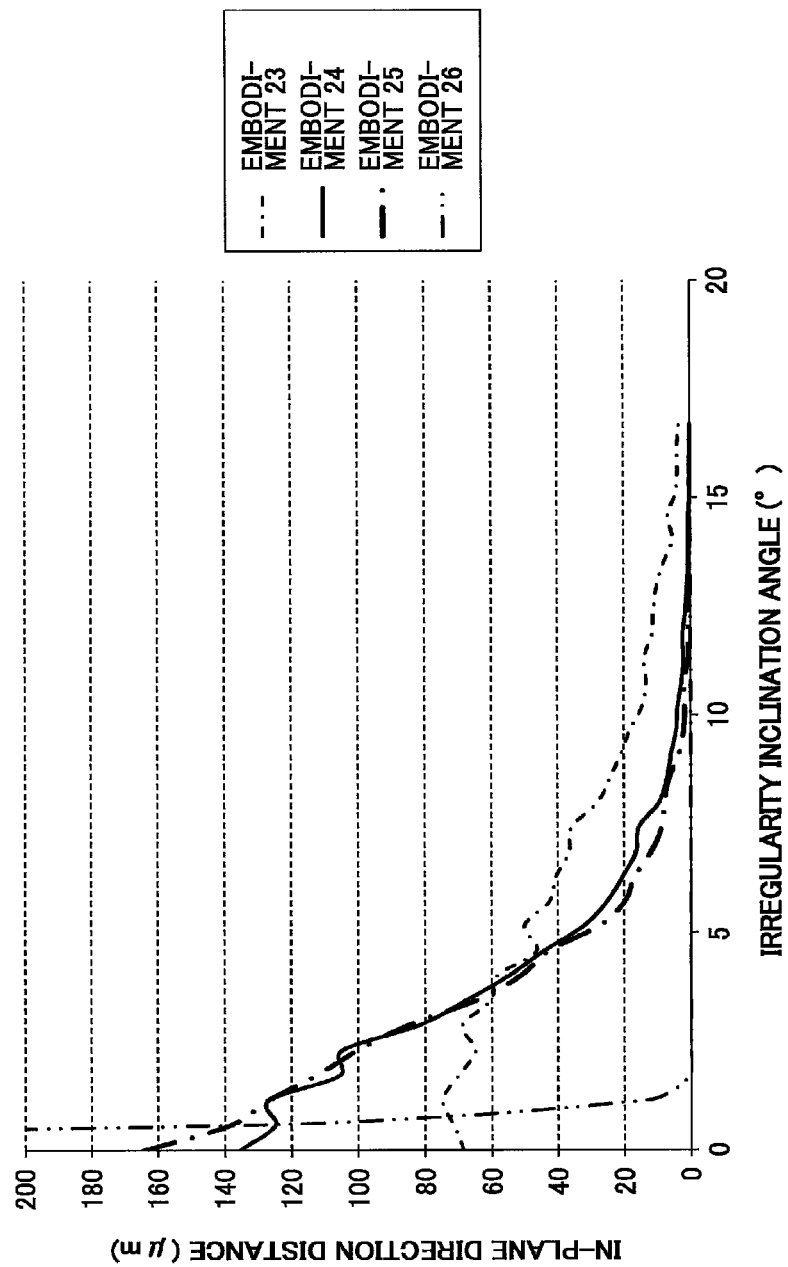
FIG. 14 is a graph depicting a correlation between an irregularity inclination angle and an in-plane direction distance of practical examples 23 to 26.

FIG. 13 is a graph for illustrating the relationship between the aspect ratios and the frequency of occurrence of the irregularities of the below-described practical examples. FIG. 14 is a graph for illustrating the relationship between the inclination angles and the in-plane direction distances of the irregularities of the below-described practical examples. The aspect ratios of the random irregularities formed on the surface of the first transparent layer 21 can be less than or equal to 0.5 and a large portion of inclination angles of the irregularities can be less than or equal to 45 degrees in a case where the degree of distribution is calculated based on FIGS. 13 and 14. Accordingly, it is preferable because haze can be reduced owing to the reduction of the amount of reflection light emitted frontward.

The process of removing high frequency components from the measured values of the irregularities when deciding the above-described height and cycles is to be performed, so that the range of the rate of change of the average roughness Ra before and after the removing process is less than or equal to 10%, and preferably less than or equal to 10%. Thereby, unnecessary noise can be disregarded when considering screen characteristics, rainbow unevenness, and splitting of the background.

The random irregularities of this embodiment are preferred to have a certain waviness. The below-described $C_k$ represents the distribution of the profile of the irregularities by resolving the frequencies of the random irregularities of the practical examples below. According to $C_k$, "N" indicates a positive integer, "ω" indicates a "frequency", "n" indicates integers from 0 to N−1, "λ" indicates a wavelength of incident light, and "i" indicates an imaginary unit.

In a case where the origin is located at a given point of a plane on which the random irregularities of the first transparent layer 21 are formed, "$x_n$" is assumed as the coordinates of a plane parallel to the main plane of the first transparent layer 21, that is, the coordinates in the in-plane direction. In this case, $x_0=0$ (mm), $x_n=xN$ (mm), and $x_n=$ (xN/N)×n (mm). Further, "$z(x_n)$" is assumed as the height of the irregularities in a vertical direction relative to the main plane of the first transparent layer 21, and "0 μm" is assumed as the lowest value of the height of the irregularities in a vertical direction.

In this embodiment, assuming a case where $c_k$, $\omega_k$, Y, X, $Y_{ave}$ are expressed with Equations 1 to 5, Equation 6 is preferably satisfied when X is greater than or equal to 20, and more preferably when X is greater than or equal to 5. Note that "k" is a value of the width of the irregularities in the in-plane direction obtained by the reciprocal of k is multiplied with xN.

According to the video projecting window of the below-described practical examples, the relationship between X and $Y_{ave}$ is illustrated with FIGS. 15 to 17. Note that FIGS. 16 and 17 are schematic diagrams illustrating an enlargement of a portion of FIG. 15.

$$c_k = c(\omega_k) = \frac{1}{N}\sum_{n=0}^{N-1} \exp\left(\frac{4\pi n z(x_n)}{\lambda}\right)\exp(-i\omega_k n) \quad \text{[Equation 1]}$$

$$\omega_k = \frac{2\pi}{N}k \quad \text{[Equation 2]}$$

$$Y = |c_k|^2 \quad \text{[Equation 3]}$$

$$X = kx_N/N \quad \text{[Equation 4]}$$

$$Y_{ave} = \frac{1}{6}\int_X^{X+6} Y(X)\,dX \quad \text{[Equation 5]}$$

$$\frac{0.01}{X^2} < Y_{ave} < \frac{0.01}{X} + 10^{-0.005\,X+1} \quad \text{[Equation 6]}$$

"X" represents the correlation of viewing angle and is expressed in units of $mm^{-1}$. "Y" represents the value of correlation of light intensity. When both X and Y are greater than, a screen is considered to have a wide viewing angle. Further, the criterion of maximum viewing angle differs depending on, for example, wavelength and incident angle. Because X is approximately 2000 under blue light and approximately 1500 under red light, the screen causes light to scatter 90 degrees with respect to incident light. Accordingly, the above-described range may be considered. In a case where the projection angle is sharp relative to the screen, a multiple of the above-described range may be considered. The range may be considered to match the projection angle relative to the screen. Further, it is preferable to set the interval and number for obtaining $x_n$ to calculate the $Y_{ave}$ of the multiples of X to be considered.

In a case of a screen in which $Y_{ave}$ becomes abruptly small in response to the change of X, the scattering angle of the screen is small. Therefore, such screen is unsuitable. In a case where both X and Y are increased, sufficient scattering angle can be attained. Nevertheless, such case where both X and Y are large is unsuitable for a material of a window because haze easily becomes large.

Further, in a case where the rate of change of X is 6 (e.g., changing X from n+1 to n+7 where n is a given number that is less than equal to half of N), an angular resolution equivalent to approximately 0.2 degrees in visible light is obtained according to the rate of change of $Y_{ave}$ calculated with Equation 5. Therefore, an abrupt change in the amount of light at this angle is highly likely to cause a spectral phenomenon in which rainbow unevenness can be recognized. As a criterion, the value of Log $Y_{ave}$ is preferably greater than or equal to 2 when the change of X is 1, and more preferably less than or equal to 1. Further, even in case where Log $Y_{ave}$ is less than or equal to when the change of X is 1, the total of the changes of Log $Y_{ave}$ during a period 20 changes is preferably less than or equal to 2, and more preferably less than or equal to 1.

Further, the randomness is to be evenly maintained. In a case where the measured coordinates shifts a certain constant distance, the calculated results of the ratio of $Y_{ave}$ when X is the same is preferably less than or equal to 100, and more preferably, less than or equal to 10. The shift amount of the measured coordinates is to be substantially equivalent or less than a single pixel of the projected image, and preferred to be within the above-described range even with a suitable value that is less than or equal to 1000 μm. Further, the calculated results of the ratio of $Y_{ave}$ is preferably less than or equal to 100 (and more preferably, less than or equal to 10) even where the measuring is performed in a direction opposite of the above-described measuring direction. Further, even in a case where the measuring direction is changed, the calculated results of the ratio of $Y_{ave}$ when X is the same is preferably less than or equal to 100, and more preferably, less than or equal to 10.

FIG. 18 is a graph for illustrating an autocorrelation of the below-described practical examples. In FIG. 18, the horizontal axis is illustrated as a degree "h" equivalent to a single cycle. Further, the autocorrelation r is calculated by Equation 7 in which $z_m$ represents the average value.

$$r = \frac{\sum_{n=1}^{N}(z(x_n)-z_m)(z(x_{n+h})-z_m)}{\sum_{n=1}^{N}(z(x_n)-z_m)^2}$$ [Equation 7]

Note that $z_m$ is the average value of the height in the measuring range. After obtaining the extreme value when the degree h is changed from 0 to positive or negative, it is preferable for the autocorrelation value to be less than or equal to ±0.7 because rainbow unevenness is suppressed, and more preferably, less than or equal to ±0.5 because randomness can be sufficiently maintained while further suppressing the rainbow unevenness.

According to the video projecting window 100 of this embodiment, the refractive index of each interface of adjacent layers is suppressed to be a suitable value of 0.5% or less when the difference of the refractive indices between each of the adjacent layers is less than or equal to 0.2. Further, the refractive index of each interface of adjacent layers is suppressed to be a more suitable value of approximately 0.1% when the difference of the refractive indices between each of the adjacent layers is less than or equal to 0.1

Further, the difference of the refractive indices between the first transparent layer 21 and the second transparent layer 22 is preferred to satisfy a relationship in which the value of Δn×Ra/λ is less than or equal to 1 in a case where "Ra" is the average roughness of the random irregularities formed on the surface of the first transparent layer 21, "λ" is the wavelength of light in the visible range, and "Δn" is the absolute value of the difference of the refractive indices between the first transparent layer 21 and the second transparent layer 22. Considering the reflectivity at the interface, the scattering light being transmitted, and the degree of freedom of the structures of the random irregularities, the difference of the refractive indices between the first transparent layer 21 and the second transparent layer 22 is preferably less than or equal to 0.1, more preferably, less than or equal to 0.05, and yet more preferably less than or equal to 0.02. In a case where the first transparent layer 21 and the second transparent layer 22 are formed of organic resin, the volume ratio of the double bond and triple bond contained in the resin of each layer is preferred to range from 50% to 150%. Further, the first transparent layer 21 and the second transparent layer 22 are preferred to satisfy in which the ratio of the density of the material in each of the layers is 80% to 120%.

The video projecting structure of this embodiment is preferably has a transmittance that is greater than or equal to 5% and less than or equal to 90% in the visible range and a reflectivity that is greater than or equal to 5% and less than or equal to 70% in the visible range. The transmittance in the visible range is more preferably greater than or equal to 10%, and yet more preferably greater than or equal to 30%. In these ranges, visibility of the outside scenery is satisfactory. In order to suitably maintain the gain for serving as a screen, the transmittance in the visible range is preferably less than or equal to 80%, and more preferably, less than or equal to 70%. Further, in a case where the background is outside scenery during the daytime, visibility is satisfactory when the transmittance in the visible range is greater than or equal to 5% and less than or equal to 50%. The screen gain is preferred to be high for functioning as a screen. Therefore, the reflectivity is preferably greater than or equal to 15%, and more preferably greater than or equal to 30%.

The video projecting structure of this embodiment may have a transmittance that is greater than or equal to 5% and less than 90% in the visible range, a reflectivity that is greater than or equal to 5% and less than or equal to 70%, and haze that is less than or equal to 20.

Next, a method for manufacturing a video projecting window according to an embodiment of the present invention is described with reference to FIGS. 3A-3C, FIG. 4A, and FIG. 4B.

First, a mold 90 having random irregularities 90a formed on its surface is prepared as illustrated in FIG. 3A. Because a film-like mold can be used to form the random irregularities, enlargement of area is facilitated. The mold 90 may be a resin film having random irregularities formed on its surface. The mold 90 may be a black or white film having a matted or a glossy surface, a mold releasing film, or a metal mold having random irregularities formed on its surface. Regarding the characteristics of the surface of the mold 90, the surface of the mold 90 is preferred to exhibit little change of glossiness in an in-plane direction. In a case where the proportion of glossiness between different areas in the in-plane direction is measured, the proportion is preferred to be within a range of 50% to 200%. The film 90 having random irregularities 90a formed on its surface is preferred not to be subjected to an easy adhesive process. The film or mold having random irregularities formed on its surface may be a film or mold in which the irregularities are formed by, for example, performing a cutting process, a dry-etching process, a wet etching process, a sandblasting process, a surface molding process by extrusion, utilizing a surface structure created when molding a mixture containing fine particles, or applying a self-assembling material on the surface formed with random irregularities. The material of the metal mold may be, for example, an Ni material, a stainless material, a Cu material, a quartz material, or a glass material. Further, a releasing process may be performed on the surface formed with random irregularities.

Then, as illustrated in FIG. 3B, the transparent substrate 10 such as a glass substrate is prepared, and a resin material such as ultraviolet (UV) curable resin is applied on the transparent substrate 10 for forming the first transparent layer 21. The resin material may be applied by, for example, die-coating, spin-coating, inkjet coating, or spray coating. Then, the mold 90 is placed on the transparent substrate 10 coated with the UV curable resin. Note that the first transparent layer 21 may be formed of a thermosetting resin or a thermoplastic resin. The mold 90 is placed, so that the surface of the mold 90 formed with the random irregularities 90a is on top of the UV curable resin. Then, the UV curable resin is cured by radiating ultraviolet (UV) light of 200 mJ to 10000 mJ on the UV curable resin. Thereby, the first transparent layer 21 is formed. In a case of forming the first transparent layer 21 with a thermosetting resin, a thermosetting resin is cured by heating after the mold 90 is placed on the thermosetting resin. Further, in a case of forming the first transparent layer 21 with a thermoplastic resin, a thermoplastic resin is solidified by cooling after placing the mold 90 on the thermoplastic resin and heating the thermoplastic resin.

Then, the mold 90 is peeled from the first transparent layer 21 as illustrated in FIG. 3C. Thereby, the surfaces of random irregularities 21a formed on the surface of the first transparent layer 21 become exposed.

Then, as illustrated in FIG. 4A, the reflection film 30 is formed on the surface of the first transparent layer 21 on which the random irregularities 21a are formed. The reflection film 30 is formed by depositing an aluminum (Al) film on the surface formed with the random irregularities 21a. The reflection film 30 may be deposited by vapor evaporation or sputtering.

Further, the reflection film 30 is preferably formed with a thickness that is less than or equal to 1 nm to 100 nm, and more preferably 4 nm to 25 nm. The reflection film 30 is preferably formed with a reflectivity that is greater than or equal to 5%, more preferably greater than or equal to 15%, and yet more preferably greater than or equal to 30%. Further, the reflection film 30 is preferred not to abruptly change depending on color. The ratio of the common logarithm of the reflectivity of each of RGB is preferred to range from 0.5 to 2 in a case where the representative wavelength of RGB is 630 nm, 530 nm, and 465 nm, respectively.

Note that the method for forming the first transparent layer 21 having random irregularities formed on its surface is not limited to the above. A material having random irregularities formed on its surface may be used as a mold to perform an imprinting method or a casting method by using a UV curable resin, a thermosetting resin, or a thermoplastic resin. Alternatively, the random irregularities may be formed by, performing a cutting process, a dry-etching process, a wet etching process, a sandblasting process, or a surface molding process by extrusion. The random irregularities may also be formed by applying a self-assembling material on a transparent substrate.

Then, as illustrated in FIG. 4B, the second transparent layer 22 is formed on the reflection film 30. More specifically, ultraviolet (UV) curable resin for forming the second transparent resin 22 is die-coated on the reflection film 30 formed on the random irregularities 21a of the first transparent layer 21. Then, the UV curable resin is cured by radiating ultraviolet (UV) light on the UV curable resin. Thereby, the second transparent layer 22 is formed. Note that the second transparent layer 22 may also be formed with a thermosetting resin or a thermoplastic resin.

Further, each of the first and second transparent layers 21, 22 is preferred to have a thickness greater than or equal to 0.5 μm except for the part of the irregularities. Considering that the first and second transparent layers 21, 22 are formed by a roll-to-roll process, the thickness of each of the first and second transparent layers 21, 22 is preferably less than or equal to 50 Further, the thickness of each of the first and second transparent layers 21, 22 is preferably less than or equal to two times the average roughness (Ra) of the irregularities because such thickness not only achieves cost reduction owing to the reduction in the amount of resin but also suppresses the formation of sinks or the like during molding.

Next, a video projecting structure according to another embodiment of the present invention is described.

The video projecting structure of the embodiment illustrated in FIG. 6 has a structure using two transparent substrates. More specifically, the video projecting structure includes a structure in which the transparent substrate 11 is laminated on the second transparent layer 22 illustrated in FIG. 1. The material of the transparent substrate 11 may be the same as or different from the material of the transparent substrate 10. The transparent substrate 11 is preferred to be formed with the same material and thickness as the preferred material and thickness described above.

The video projecting structure of this embodiment has the first transparent layer 21, the reflection film 30, and the second transparent layer 22 formed on the transparent film 40 as illustrated in FIG. 6.

As illustrated in FIG. 6, the video projecting structure of this embodiment includes the transparent film 40 on which the first transparent layer 21, the reflection film 30, and the second transparent layer 22 are formed. The transparent substrate 10 is laminated on the side of the transparent film 40 whereas the transparent substrate 11 is laminated on the side of the second transparent layer 22. The video projecting structure of this film allows the first transparent layer 21, the reflection film 30, and the transparent layer 22 to be formed on the transparent film 40 instead of forming the first transparent layer 21, the reflection film 30, and the transparent layer 22 directly on the transparent substrate 10 formed of glass or the like. Therefore, the video projecting structure can be manufactured with an inexpensive manufacturing method such as a roll-to-roll method. The transparent film 40 and the transparent substrate 10 are illustrated in FIG. 6 as separates for the sake of convenience. However, the transparent film 40 and the transparent substrate 10 may be an integrated body. Further, the first transparent layer 21 may be the same as the transparent film 40 and formed from a single material. That is, irregularities of the first transparent layer 21 may be formed by roughening the surface of the transparent film 40 by performing, for example, a sandblasting process.

The transparent film 40 may be a transparent resin film or a thin glass film. The transparent film 40 preferably has a thickness allowing a roll-to-roll process to be used. The thickness of the transparent film 40 is preferably 0.01 mm to 0.5 mm, more preferably 0.05 mm to 0.3 mm, and yet more preferably less than or equal to 0.15 mm.

The video projecting structure of the embodiment illustrated in FIG. 7 has the first transparent layer 21, the reflection film 30, and the second transparent layer 22 formed on the transparent film 40. Because the video projecting structure of this embodiment has a thin structure in which the first transparent layer 21, the reflection film 30, and the second transparent layer 22 formed on the transparent film 40 are formed on the transparent film 40, lamination using an adhesive or changing of shape can be performed. Thus, the video projecting structure of this embodiment suited to be used as a material for forming a video projecting window or the like that has a curved surface.

The video projecting structure of the embodiment illustrated in FIG. 8 is a video projecting window having a structure of a laminated glass. More specifically, a structure having the first transparent film 41 and the first glass substrate 61 adhered to each other by way of an adhesive layer 51 is laminated to a first transparent layer 21 side of a structure including the first transparent layer 21, the reflection film 30, and the second transparent layer 22. Further, a structure having the second transparent film 42 and a second glass substrate 62 adhered to each other by way of an adhesive layer 52 is laminated to a second transparent layer 22 side of the a structure including the first transparent layer 21, the reflection film 30, and the second transparent layer 22. Alternatively, the second glass substrate 62 may be adhered to the second transparent layer 22 via the adhesive layer 52 without providing the second transparent film 42. In the video projecting structure of this embodiment, the adhesive layer 51, 52 are formed of, for example, an adhesive such as EVA (Ethylene-vinyl acetate) resin, PVB (Poly vinyl butyral) resin, or an acrylic adhesive, or a UV curable resin.

Note that the adhesive layers 51, 52 are for adhering the first glass substrate 61 to the first transparent film 41 and adhering the second glass substrate 62 to the second transparent film 42. The adhesive layers 51, 52 may include a thermoplastic resin compound having a thermoplastic resin as its main component. The thickness of each of the adhesive layers 51, 52 is not limited in particular. For example, the thickness of each of the adhesive layers 51, 52 is preferably 0.01 mm to 1.5 mm, and more preferably, 0.05 mm to 0.5 mm.

The thermoplastic resin used for the adhesive layers 51, 52 may be a thermoplastic resin that is conventionally used for an adhesive purpose. For example, plasticized polyvinyl acetal resin, plasticized polyvinyl chloride resin, saturated polyester resin, plasticized saturated polyester resin, polyurethane resin, plasticized polyurethane resin, ethylene-vinyl acetate copolymer resin, ethylene-ethyl acrylate copolymer resin may be used.

In the video projecting window of the embodiment illustrated in FIG. 9, the glass substrates used in the video projecting window of FIG. 8 may be formed into a single substrate. More specifically, a structure having the first transparent film 41 and the first glass substrate 61 adhered to each other by way of an adhesive layer 51 is laminated to a first transparent layer 21 side of a structure including the first transparent layer 21, the reflection film 30, and the second transparent layer 22 whereas the second transparent film 42 is laminated to the second transparent layer 22. Alternatively, the video projecting window of this embodiment may be a structure without the second transparent film.

The video projecting structure of the above-described embodiment not only can be used as a reflection type screen but can also prevent unevenness of color due to light diffraction or degrading of visibility in which light diffraction causes rainbow color to appear at the edge part of the image transmitted through the video projecting window. That is, the video projecting structure of the above-described embodiment can suppress the occurring of a phenomenon shades of color being changed depending on the direction or position of viewing the video projecting window, or the direction of the light incident on the video projecting window, and prevent splitting of a transmitted background. Accordingly, the video projecting window of the above-described embodiments can serve as a window having the properties of satisfactory visibility of background and satisfactory color reproduction of background and projected images, and no distraction of view.

That is, in a case where a video is not projected, the video projecting structure of the above-described embodiment functions as a transparent window in which outside scenery can be viewed from indoors. In a case where video is projected from an indoor projector, the window can serve as a window that functions as a video projecting window allowing the projected video to be viewed indoors.

The video projecting window 100 of this embodiment is a reflection type video projecting window. As illustrated in FIG. 2, the video projection window 100 is for enabling video reflected from the video projecting window 100 to be viewed by a viewer on the opposite side of the projector 100 by projecting the video to the video projecting window 100 from the projector 110.

Next, the usages of the video projecting structure according to the first and second embodiments of the present invention are described.

Displaying an image for the interior of a living space, for a commercial, or for an educational purpose Displaying an advertisement by projecting an image from the inside of a building Displaying information, an advertisement or the like at a car dealer Displaying an advertisement, a movie on a triangular small window or a fixed sash window of a building or changing the exterior design of the building (particularly, an upper part of a window)

Displaying advertisements, information, events by using a glass door of a supermarket, a retail store, or a public building Displaying growth information or the like as a construction material of a greenhouse or the like Displaying an image as a glass wall capable of changing a pattern of wallpaper Displaying an image as a backboard of a stadium or a studio Displaying an image as a partition of a bathroom of a hotel or the like Displaying a suitable video and projecting light or not light to serve as a switchable privacy screen. Particularly, security can be improved when guarding in a conference room, a hospital, a bank, a restaurant, or a public facility in a case where the privacy screen is not used because the other side can be clearly seen when no light is being projected.

Displaying a character, a sign, an image, a video at an airport, a train station, a hospital, or a school Displaying local information or sightseeing information at a religious facility such as a temple, a shrine, or a church Producing a space in a commercial facility Projection mapping Displaying a character, a sign, an image, or a video at a stadium Projecting information and personal videos at a kitchen Using as a whiteboard as a writable and displayable tool for a school or a meeting Further, it can also serve as a user interface Using as a pair glass for a heat insulation glass to serve as a refrigerator door in a supermarket or a convenience store The following are usages of the video projecting structure when the video projecting structure is used as, for example, a table-top or a casing.

Using as a table-top in a restaurant

Using as a counter of a sushi restaurant

Using as a desk (desktop) or a kitchen counter

Using as a table-top partition

Using as a showcase in a basement floor of a department store

Using as a showcase or a dressing room of boutique shop

Using as a vending machine

Using as a partition in a pachinko parlor or a front glass of a pachinko machine. Displaying a store's advertisement on a front glass of the pachinko machine when the pachinko machine is unoccupied The following are usages of the video projecting structure when the video projecting structure is used in a vehicle.

Use in a Railway Train

Using as a window glass at a rear side of a driver (prevention of reflection of lighting inside vehicle when running underground)

Displaying information on a side glass of a railway train

Displaying on a hanging advertisement inside a railway train

Using as a part of a partition inside a bullet train

Using as a window glass of a linear motor car

Adding a screen function to a window of a railway train

Particularly, suitable for use after sundown or the like because visibility increases after sundown Use in an Automobile or the Like Displaying information in a shade part of a front glass an automobile Displaying information in a lower part of front glass of an automobile Displaying information in a partition inside a taxi or a limousine, displaying an advertisement inside a video displaying bus (Behind driver)

Using as a sun visor of an automobile

Displaying a video of television or a DVD as a partition inside minivan or an SUV Using as a warning sign or the like on a door glass when opening a door on the side of an automobile Installing to a rear glass of an automobile, displaying information to a rear side with a backlight or HMSL (High Mount Stop Light), and displaying a destination of a bus or the like Using in a surrounding of a meter Using as a screen for a door glass Further, the video projecting structure may use a function of diffusing reflected light or transmitted light such as an anti-glare glass or an anti-glare mirror. Further, the video projecting structure may be used as a head-up display of an automobile and an screen for projecting a video.

Further, the video projecting structure may also be used to enhance design by being used on a floor or the steps of stairs or the like or display a warning such as "watch your step".

Further, the video projecting structure may also be used for a special purpose such as a cover glass of a traffic light (combination of a display of various signals).

Practical Examples 1-22

Practical Example 1

First, a sandblast film having random irregularities on its surface is used as the mold 90. The average roughness (Ra) of the random irregularities formed on the surface of the mold 90 was approximately 0.16 µm.

Then, as illustrated in FIG. 3B, a PET film having a thickness of 0.1 mm was prepared. OGZOL EA-F5003 serving as the UV curable resin for forming the first transparent layer 21 was applied on the PET film by a die-coating method. Then, the mold 90 was placed on the UV curable resin applied on the PET film. The mold 90 was placed in a manner that the surface on which the random irregularities are formed is on top of the UV curable resin. Then, by radiating ultraviolet (UV) of 1000 mJ on the UV curable resin, the UV curable resin was cured. Thereby, the first transparent layer 21 was formed.

Then, as illustrated in FIG. 3C, the mold 90 was peeled from the first transparent layer 21. Thereby, the surfaces of the random irregularities 21a formed on the surface of the first transparent layer 21 became exposed.

Then, as illustrated in FIG. 3C, the mold 90 was peeled from the first transparent layer 21. Thereby, the surfaces of the random irregularities 21a formed on the surface of the first transparent layer 21 became exposed.

Then, as illustrated in FIG. 4A, the reflection film 30 was formed on the surface of the first transparent layer 21 on which the random irregularities 21a were formed. The reflection film 30 was formed by depositing an aluminum (Al) film of 4 nm on the surface formed with the random irregularities 21a. The reflection film 30 was deposited by vapor evaporation.

Then, as illustrated in FIG. 4B, OGZOL EA-F5003 serving as the UV curable resin for forming the second transparent layer 22 was applied on the reflection film 30 by a die-coating method. Then, the UV curable resin was cured by radiating UV light of 1000 mJ on the UV curable resin. Thereby, the second transparent layer 22 was formed. Accordingly, the video projecting structure was fabricated.

Practical Examples 2-22

The video projecting structure was manufactured by using the same method as the first practical example. However, the mold and the thickness of the aluminum (Al) of the reflection film 30 were changed.

The following molds were used as the mold. In practical examples 1, 4, 10, 13, 19, 20, and 22, a PET film was used as the mold in which the shapes of the surface formed by mixing fine particles of titanium had an arithmetic average roughness (Ra) of 1.20 µm. In practical examples 3, 6, 12, and 16, the same type of PET film was used except that the average roughness (Ra) of the surface was 0.05 µm. In practical examples 9 and 11, the same PET film was used except that the average roughness (Ra) of the surface was 0.09 µm. In practical examples 5 and 8, the same type of PET film was used except that the average roughness (Ra) of the surface was 0.10 µm. In practical examples 7 and 14, the same type of PET film was used except that the average roughness (Ra) of the surface was 0.20 µm. Further, in practical examples 2, 17, and 21, the surface of the PET film was sandblasted in which the average roughness (Ra) of the surface was 0.34 µm. In practical example 18, the surface of the same type of type of PET film was used except that the average roughness (Ra) of the surface was 0.30 µm. In practical example 15, the same type of PET film was used except that the average roughness (Ra) of the random surface was 0.48 µm.

Further, the thickness of aluminum (Al) of practical examples 1 and 2 was 4 nm, the thickness of aluminum (Al) of practical examples 3 to 5 was 6 nm, the thickness of aluminum (Al) of practical examples 6 to 15, 17, and 18 was 8 nm, the thickness of aluminum (Al) of practical examples 16 and 19 to 21 was 12 nm, the thickness of aluminum (Al) of practical example 22 was 20 nm.

Comparative Example 1

A soda-lime glass substrate having a thickness of 3 mm was prepared.

Comparative Examples 2 to 4

A screen using a scattering material was prepared. The scattering material had titanium fine particles mixed with polymer material. A screen was formed by applying the scattering material on the glass substrate of the comparative example. In doing so, the density and thickness of the fine particles, and the state of the surface were changed.

According to the above-described practical examples and comparative examples of the video projecting structure, the optical characteristics shown in Table 1 were measured and evaluated. The results are shown in Table 1.

TABLE 1

| | TRANSMITTANCE | REFLECTANCE | FRONT HAZE | REAR HAZE | REAR HAZE/ FRONT HAZE | REAR SCATTERING BY 45° INCIDENT LIGHT/FRONT SCATTERING BY 45° INCIDENT LIGHT | REAR SCATTERING BY 45° INCIDENT LIGHT/FRONT SCATTERING BY 45° INCIDENT LIGHT/FRONT HAZE |
|---|---|---|---|---|---|---|---|
| COMPARATIVE EXAMPLE 1 | 90.7 | 9.3 | 0.1 | 0.3 | 3.0 | 3.0 | 30.00 |
| EMBODIMENT 1 | 81.3 | 8.5 | 0.6 | 15.7 | 26.2 | 0.8 | 1.27 |
| EMBODIMENT 2 | 75.4 | 8.2 | 2.7 | 18.4 | 7.0 | 1.1 | 0.40 |
| EMBODIMENT 3 | 68.9 | 8.4 | 0.6 | 14.2 | 22.6 | 1.0 | 1.60 |
| EMBODIMENT 4 | 64.1 | 8.4 | 1.0 | 19.7 | 19.7 | 1.0 | 0.95 |
| EMBODIMENT 5 | 56.9 | 9.9 | 0.9 | 34.4 | 38.2 | 1.2 | 1.36 |
| EMBODIMENT 6 | 55.0 | 19.9 | 1.2 | 9.1 | 7.6 | 2.0 | 1.67 |
| EMBODIMENT 7 | 54.8 | 9.8 | 2.1 | 33.9 | 16.2 | 1.6 | 0.77 |
| EMBODIMENT 8 | 51.6 | 11.9 | 1.8 | 47.4 | 26.4 | 3.0 | 1.64 |
| EMBODIMENT 9 | 49.4 | 12.6 | 1.7 | 48.3 | 28.4 | 2.4 | 1.41 |
| EMBODIMENT 10 | 49.2 | 13.1 | 1.4 | 34.9 | 24.9 | 1.9 | 1.38 |
| EMBODIMENT 11 | 47.9 | 12.6 | 3.7 | 50.4 | 13.6 | 2.5 | 0.68 |
| EMBODIMENT 12 | 47.3 | 14.4 | 1.8 | 41.0 | 22.8 | 2.0 | 1.12 |
| EMBODIMENT 13 | 45.4 | 15.7 | 2.4 | 50.5 | 21.1 | 2.1 | 0.87 |
| EMBODIMENT 14 | 44.9 | 17.8 | 2.9 | 53.3 | 18.4 | 2.4 | 0.83 |
| EMBODIMENT 15 | 40.1 | 14.4 | 3.6 | 62.0 | 17.2 | 4.4 | 1.22 |
| EMBODIMENT 16 | 17.7 | 51.0 | 3.9 | 30.0 | 7.7 | 23.7 | 6.06 |
| EMBODIMENT 17 | 42.5 | 11.4 | 8.2 | 49.1 | 6.0 | 1.8 | 0.22 |
| EMBODIMENT 18 | 41.0 | 12.8 | 7.3 | 60.1 | 8.2 | 2.0 | 0.28 |
| EMBODIMENT 19 | 21.0 | 45.1 | 7.0 | 68.3 | 9.8 | 5.1 | 0.73 |
| EMBODIMENT 20 | 18.1 | 41.6 | 8.2 | 51.1 | 6.2 | 5.6 | 0.68 |
| EMBODIMENT 21 | 17.9 | 29.7 | 17.3 | 82.2 | 4.7 | 10.8 | 0.63 |
| EMBODIMENT 22 | 11.6 | 50.5 | 9.3 | 49.9 | 5.4 | 6.7 | 0.72 |
| COMPARATIVE EXAMPLE 2 | 87.7 | 11.6 | 30.2 | 48.6 | 1.6 | 0.4 | 0.01 |
| COMPARATIVE EXAMPLE 3 | 71.8 | 9.0 | 23.6 | 34.2 | 1.4 | 0.4 | 0.02 |
| COMPARATIVE EXAMPLE 4 | 80.9 | 13.4 | 85.0 | 94.2 | 1.1 | 0.5 | 0.01 |

| | REAR HAZE/ FRONT HAZE × REAR SCATTERING BY 45° INCIDENT LIGHT/ FRONT SCATTERING BY 45° INCIDENT LIGHT | Ra OF IRREGULARITIES (μm) | BACKGROUND VISIBILITY | IMAGE VISIBILITY |
|---|---|---|---|---|
| COMPARATIVE EXAMPLE 1 | 9.0 | — | 0 | 3 |
| EMBODIMENT 1 | 20.0 | 1.20 | 0 | 2 |
| EMBODIMENT 2 | 7.4 | 0.34 | 0 | 2 |
| EMBODIMENT 3 | 22.7 | 0.05 | 0 | 2 |
| EMBODIMENT 4 | 18.8 | 1.20 | 0 | 2 |
| EMBODIMENT 5 | 46.7 | 0.10 | 0 | 1 |
| EMBODIMENT 6 | 15.2 | 0.05 | 0 | 1 |
| EMBODIMENT 7 | 26.1 | 0.20 | 0 | 1 |
| EMBODIMENT 8 | 78.0 | 0.10 | 0 | 1 |
| EMBODIMENT 9 | 68.3 | 0.09 | 0 | 1 |
| EMBODIMENT 10 | 48.1 | 1.20 | 0 | 1 |
| EMBODIMENT 11 | 34.1 | 0.09 | 0 | 1 |
| EMBODIMENT 12 | 46.0 | 0.05 | 0 | 1 |
| EMBODIMENT 13 | 44.0 | 1.20 | 0 | 1 |
| EMBODIMENT 14 | 44.4 | 0.20 | 0 | 1 |
| EMBODIMENT 15 | 75.4 | 0.48 | 0 | 1 |
| EMBODIMENT 16 | 181.7 | 0.05 | 0 | 0 |
| EMBODIMENT 17 | 10.7 | 0.34 | 1 | 1 |
| EMBODIMENT 18 | 16.7 | 0.30 | 1 | 1 |
| EMBODIMENT 19 | 49.8 | 1.20 | 1 | 0 |
| EMBODIMENT 20 | 34.7 | 1.20 | 1 | 0 |
| EMBODIMENT 21 | 51.5 | 0.34 | 1 | 0 |
| EMBODIMENT 22 | 36.1 | 1.20 | 1 | 0 |
| COMPARATIVE EXAMPLE 2 | 0.6 | — | 2 | 1 |

TABLE 1-continued

| | | | | |
|---|---|---|---|---|
| COMPARATIVE EXAMPLE 3 | 0.6 | — | 2 | 1 |
| COMPARATIVE EXAMPLE 4 | 0.5 | — | 3 | 1 |

BACKGROUND VISIBILITY 0: GOOD 1: GOOD IF NEARSIDE IS DARK OR EXTERNAL LIGHT IS SMALL 2: BACKGROUND RECOGNITION POSSIBLE LEVEL 3: IMPOSSIBLE
IMAGE VISIBILITY 0: GOOD 1: GOOD IF SURROUNDING IS DARK 2: GENERAL RECOGNITION POSSIBLE LEVEL 3: IMPOSSIBLE

Figure 19A:
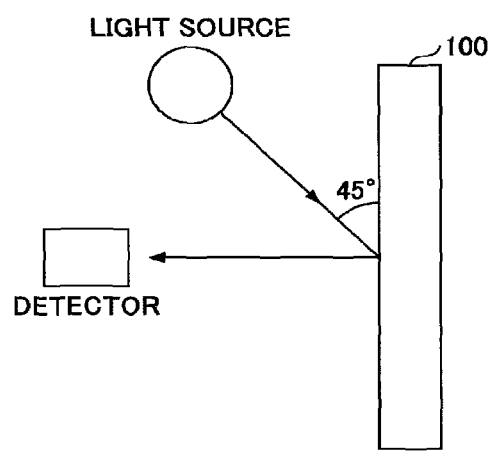
FIGS. 19A and 19B are schematic diagrams illustrating a method for measuring front scattering and rear scattering when light is incident at an angle of 45 degrees.
Figure 19B:
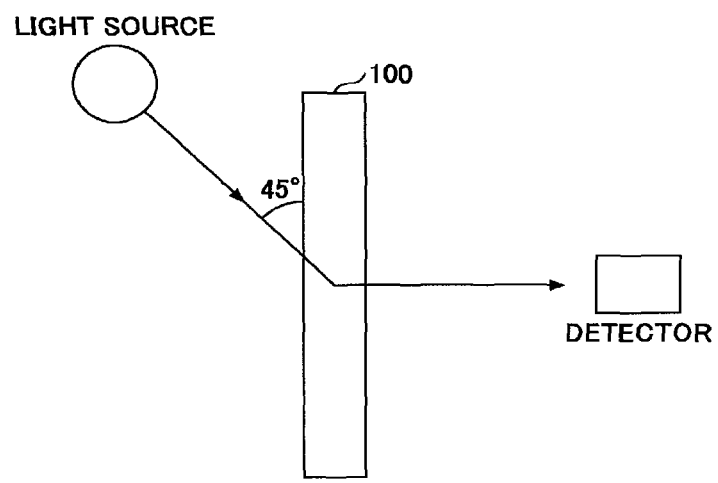

Note that the term "rear scattering when light is incident at 45°" indicates scattering light that scatters backward in a normal direction of the video projecting window 100 when light is incident on the surface of the video projecting window 100 at an angle of 45 degrees as illustrated in FIG. 19A. The term "front scattering when light is incident at 45°" indicates scattering light that scatters frontward in a normal direction of the video projecting window 100 when light is incident on the surface of the video projecting window 100 at an angle of 45 degrees as illustrated in FIG. 19B.

In Table 1, the term "background visibility" refers to the visibility of the background or the like that can be seen through the video projecting window 100. "0" indicates an evaluation "satisfactory at far distance", "1" indicates an evaluation "satisfactory" "2" indicates an evaluation "background recognizable level", and "3" indicates an evaluation "not visible".

Further, the term "image visibility" refers to the visibility of an image that can be seen through the video projecting window when the image is projected to the video projecting window. "0" indicates an evaluation "satisfactory", "1" indicates an evaluation "satisfactory when surrounding is dark", "2" indicates an evaluation "generally recognizable level", and "3" indicates an evaluation "not visible".

Next, the practical examples 23-30 of the second embodiment are described. Note that the average roughness (Ra) of the random irregularities and PV values were measured with a contact type surface shape measuring device.

Practical Examples 23-30

Practical Example 23

First, a sandblast film having random irregularities on its surface is used as the mold 90. The average roughness (Ra) of the random irregularities formed on the surface of the mold 90 was approximately 0.48 µm, and the PV value was 3.1 µm.

Then, as illustrated in FIG. 3B, a PET film having a thickness of 0.1 mm was prepared. OGZOL EA-F5003 (Osaka Gas Co., acrylic monomer) serving as the UV curable resin for forming the first transparent layer 21 was applied on the PET film by a die-coating method.

Then, the mold 90 was placed on the UV curable resin applied on the PET film. The mold 90 was placed in a manner that the surface on which the random irregularities are formed is on top of the UV curable resin. Then, by radiating ultraviolet (UV) of 1000 mJ on the UV curable resin, the UV curable resin was cured. Thereby, the first transparent layer 21 was formed.

Then, as illustrated in FIG. 3C, the mold 90 was peeled from the first transparent layer 21. Thereby, the surfaces of the random irregularities 21a formed on the surface of the first transparent layer 21 became exposed.

Then, as illustrated in FIG. 4A, the reflection film 30 was formed on the surface of the first transparent layer 21 on which the random irregularities 21a were formed. The reflection film 30 was formed by depositing an aluminum (Al) film of 4 nm on the surface formed with the random irregularities 21a. The reflection film 30 was deposited by vapor evaporation.

Then, as illustrated in FIG. 4B, OGZOL EA-F5003 (Osaka Gas Co., acrylic monomer) serving as the UV curable resin for forming the second transparent layer 22 was applied on the reflection film 30 by a die-coating method. Then, the UV curable resin was cured by radiating UV light of 1000 mJ on the UV curable resin. Thereby, the second transparent layer 22 was formed. Accordingly, the video projecting structure was fabricated. At this point, the fabricated structure is hereinafter referred to as "PET film layered body".

Then, two sheets of soda-lime glass each having a thickness of 2 mm were prepared to be used as the transparent substrate 10 and the transparent substrate 11. Further, two sheets of PVB film each having a thickness of 30 mil (0.762 mm) were prepared. Then, the transparent substrate 10, the PVB film, the PET film layered body, the PVB film, and the transparent substrate 11 were layered in this order, and formed into a vacuum pack. Further, the transparent substrate 10, the PVB film, the PET film layered body, the PVB film, and the transparent substrate 11 being in the vacuum packed state were heated at a temperature of 120° C. for 1 hour. Accordingly, the video projecting window illustrated in FIG. 6 was manufactured.

The manufactured video projecting window was formed having random irregularities on the surface of the first transparent layer 21 in which the average roughness (Ra) and the PV value of the random irregularities were 0.48 µm and 3.1 µm. The video projecting window had a transmittance of 42% at the D-line, a reflectivity of 11%, and haze of 8. Further, because the random irregularities had no periodicity, no rainbow unevenness due to light diffraction occurred. Therefore, no rainbow unevenness due to spectral diffraction was observed at the edge part of the image seen through the video projecting window. Further, there was no occurrence of a phenomenon in which shades of color are changed depending on the direction or position of viewing the video projecting window, or the direction of the light incident on the video projecting window. Further, no spitting of the transmitted background occurred. Accordingly, background could be clearly seen through the video projecting window, and high resolution video could be seen when the video is projected from a projector.

Practical Example 24

A video projecting window was manufactured with the same method as practical example 23 except that a white PET film having random irregularities formed on its surface and containing fine particles was used as the mold 90. The random irregularities on the surface of the mold 90 had an average roughness (Ra) of 0.3 µm and a PV value of 1.2 µm.

In the manufactured video projecting window, the random irregularities formed on surface of the first transparent layer 21 had an average roughness (Ra) of 0.1 μm and a PV value of 1.2 μm. The video projecting window had a transmittance of 45% at the D-line, a reflectivity of 13%, and haze of 4. The background could be clearly seen through the video projecting window, and high resolution video could be seen when the video is projected from a projector.

Practical Example 25

A video projecting window was manufactured with the same method as practical example 24 except that a white PET film having random irregularities formed on its surface and containing fine particles was used as the mold 90. The random irregularities on the surface of the mold 90 had an average roughness (Ra) of 0.09 μm.

In the manufactured video projecting window, the random irregularities formed on the surface of the first transparent layer 21 had a roughness average (Ra) of 0.09 μm. The manufactured video projecting window had a transmittance of 45% at the D-line, a reflectivity of 16%, and haze of 3. The background could be clearly seen through the video projecting window, and high resolution video could be seen when the video is projected from a projector.

Practical Example 26

A video projecting window was manufactured by the same method as practical example 23 except that a white PET film having random irregularities formed on its surface and containing fine particles was used as the mold 90. The random irregularities on the surface of the mold 90 had an average roughness (Ra) of 0.05 μm.

In the manufactured video projecting window, the random irregularities formed on the surface of the first transparent layer 21 had a roughness average (Ra) of 0.05 μm. The manufactured video projecting window had a transmittance of 47% at the D-line, a reflectivity of 14%, and haze of 2. The background could be clearly seen through the video projecting window, and high resolution video could be seen when the video is projected from a projector.

In a case of measuring the height of the irregularities formed on the surface of the first transparent layer 21 and assuming that the measured height is a single cycle of PV values, the median of the measured height of practical example 23 was 0.1 μm, the median of the measured height of practical example 24 was 0.04 μm, the median of the measured height of practical example 25 was 0.04 μm, the median of the measured height of practical example 26 was 0.005 μm.

FIG. 11 is a graph depicting a correlation between an irregularity height and an occurrence frequency of practical examples 23 to 26. According to the correlation between an irregularity height and an occurrence frequency of FIG. 11, the frequency of the height corresponding to the peak or the value of the frequency of the height corresponding to half of the median value was 225% in practical example 23, 200% in practical example 24, 200% in practical example 25, and 160% in practical example 26.

The width of the peak among the frequency distribution of the widths of the random irregularities formed on the first transparent layer 21 was 3 μm in practical example 23, 4 μm in practical example 24, 3 μm in practical example 25, and 2 μm in practical example 26.

FIG. 12 is a graph for illustrating the relationship between the cycles and the frequency of occurrence of the practical examples. In the frequency distribution of the random irregularities formed on the surface of the first transparent layer 21, the value of one half of the degree of the cycle of peaks of practical example 23 was 40% at the lower side and 180% at the higher side. The value of one half of the degree of the cycle of peaks of practical example 24 was 25% at the lower side and 125% at the higher side. The value of one half of the degree of the cycle of peaks of practical example 25 was 30% at the lower side and 180% at the higher side. The value of one half of the degree of the cycle of peaks of practical example 26 was 50% at the lower side and 135% at the higher side.

FIG. 13 is a graph for illustrating the relationship between the aspect ratios and the frequency of occurrence of the irregularities of the practical examples. FIG. 14 is a graph for illustrating the relationship between the inclination angles and the in-plane direction distances of the irregularities of the practical examples. The aspect ratios of the random irregularities formed on the surface of the first transparent layer 21 was 0.04 for practical example 23, 0.02 for practical example 24, 0.02 for practical example 25, and 0.01 for practical example 26 in a case of measuring from the peak. The median value of the inclination angles of the irregularities was 4° for practical example 23, 2° for practical example 24, 5° for practical example 25, and 0.2° for practical example 26. Further, in a case where the inclination angles of the irregularities is in a range of 80%, the inclination angle was 8° for practical example 23, 4.5° for practical example 24, 4.0° for practical example 25, and 0.5° for practical example 26. When determining the above-described heights and cycles of the irregularities, high frequencies were removed where the change rate of the average roughness (Ra) was in a range less than or equal to 0.5%.

Figure 15:
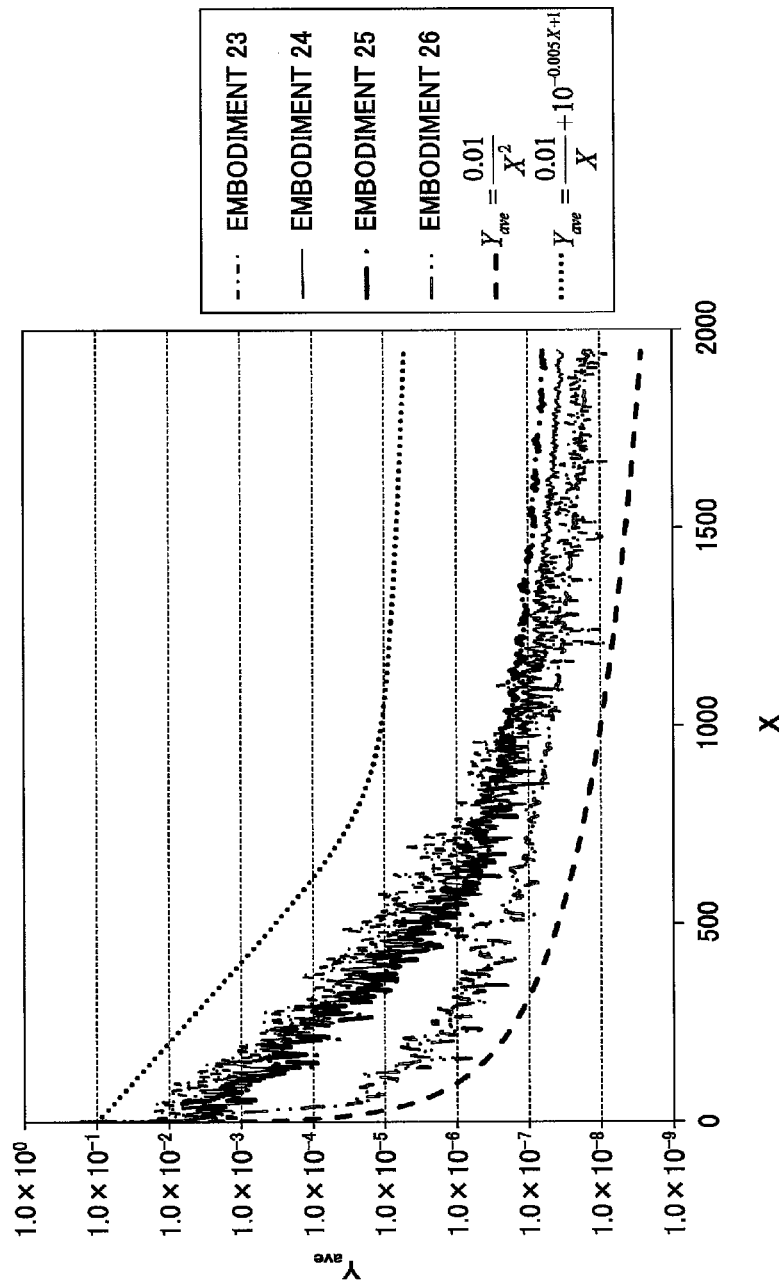
FIG. 15 is a graph depicting a correlation between X and $Y_{ave}$ of a video projecting window according to an embodiment of the present invention.
Figure 16:
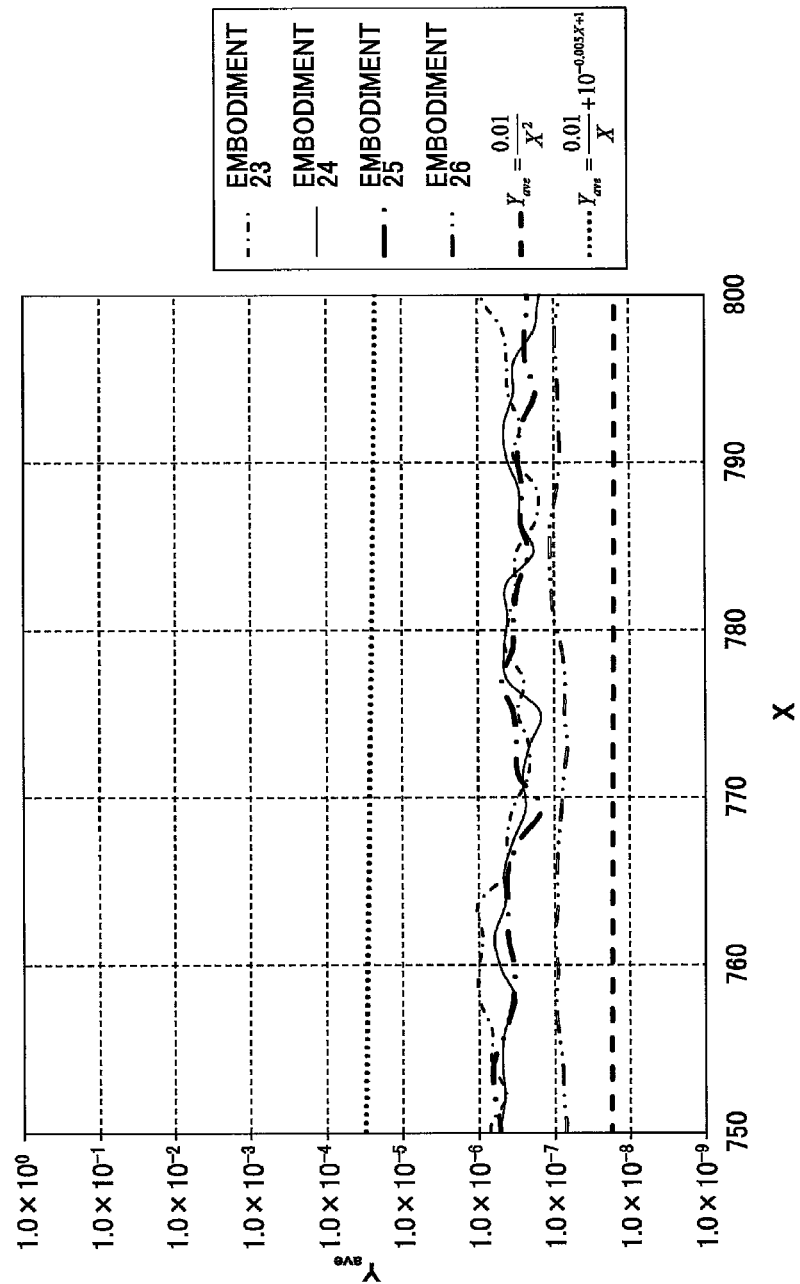
FIG. 16 is a partial enlarged view (1) of FIG. 15.
Figure 17:
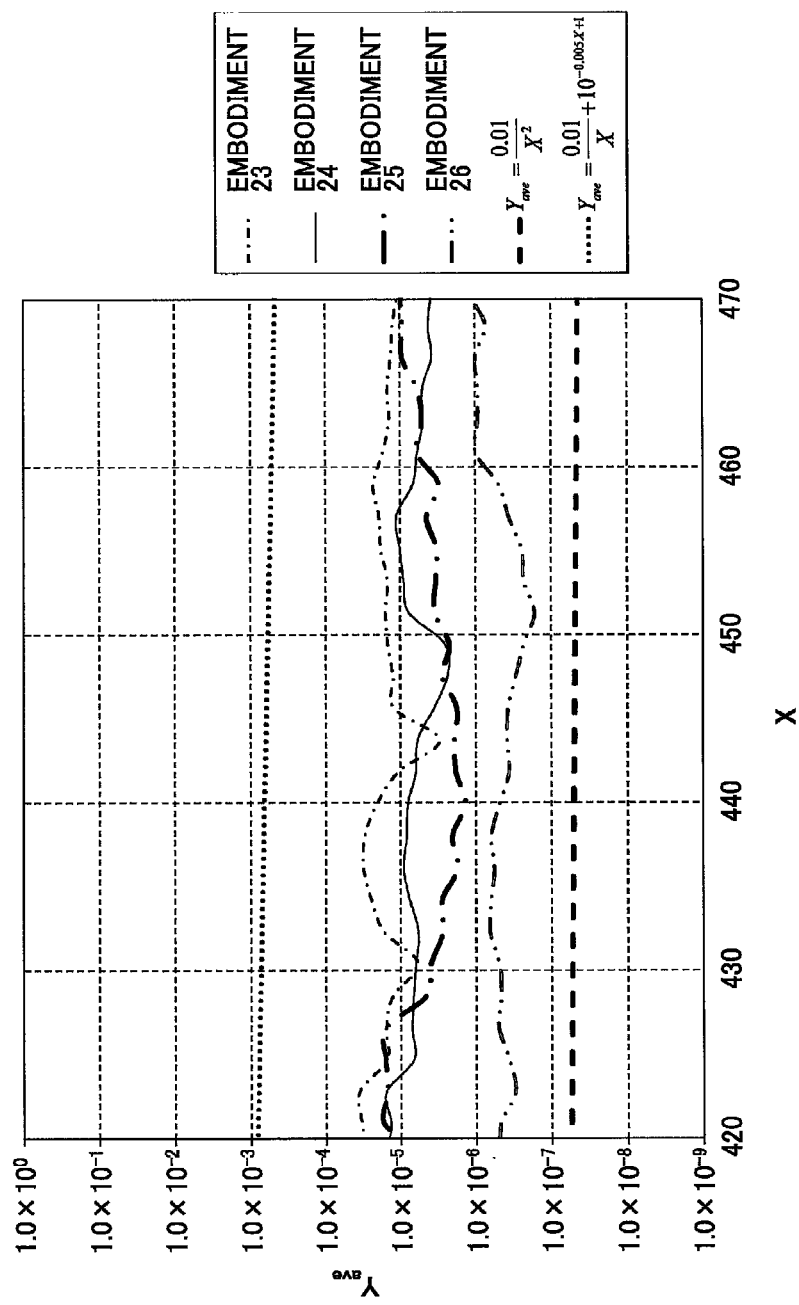
FIG. 17 is a partial enlarged view (2) of FIG. 15.

FIGS. 15 to 17 illustrate a correlation between X and $Y_{ave}$ of the video projecting windows of practical examples 23 to 26.

FIG. 18 is a graph illustrating an autocorrelation coefficient of practical examples 23 to 26. In FIG. 18, the horizontal axis is illustrated as a degree "h" equivalent to a single cycle. Further, the autocorrelation r is calculated by Equation 7 in which $z_m$ represents the average value. In practical examples 23 to 26, the autocorrelation value was less than or equal to ±0.7 after obtaining the extreme value when the degree h is changed from 0 to positive or negative Comparative Examples 5, 6

Figure 21:
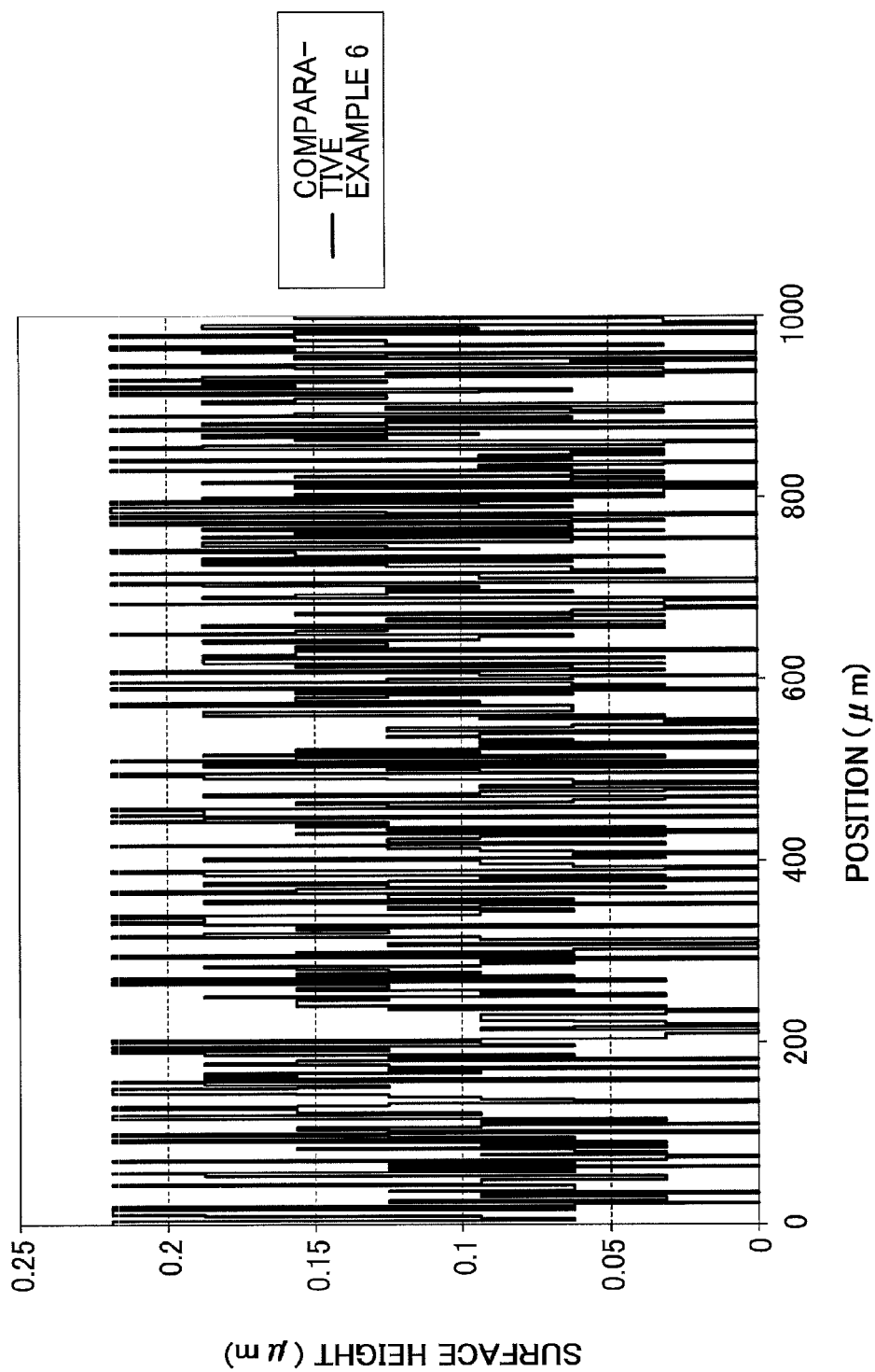
FIG. 21 is a graph depicting a shape of a surface of a first transparent layer of a sixth comparative example.
Figure 22:
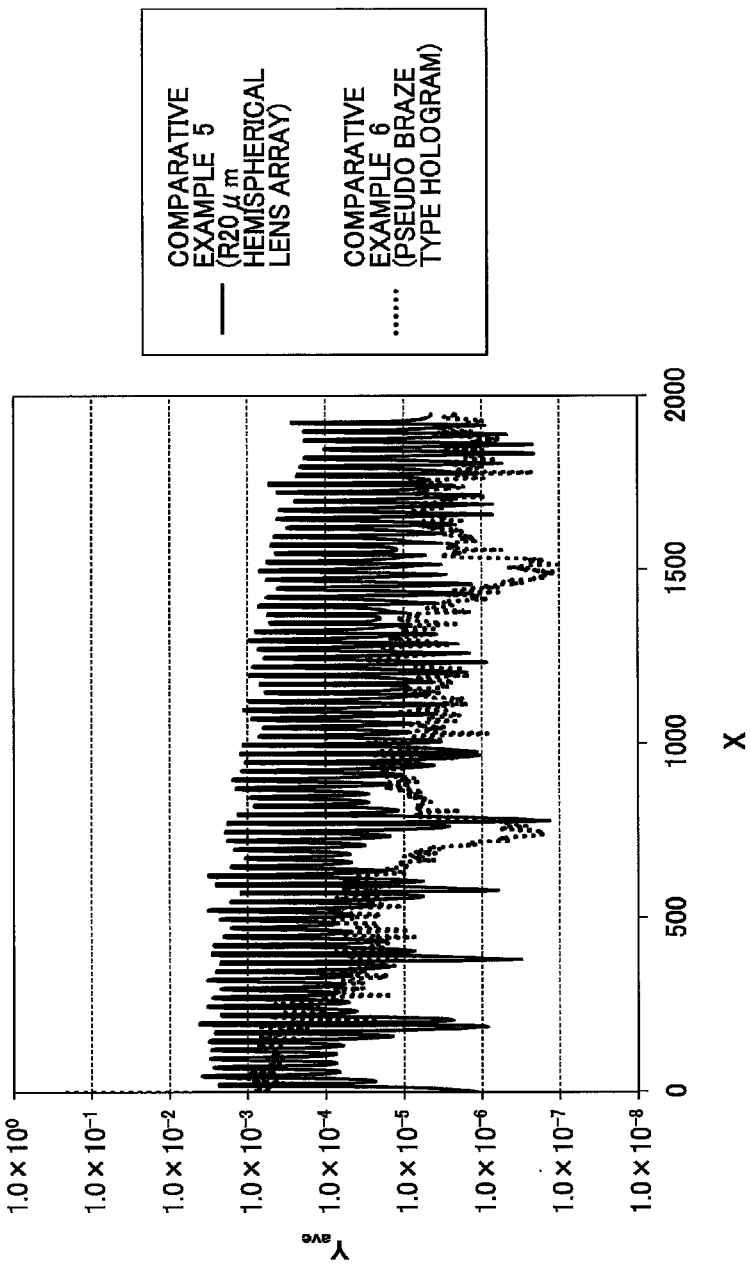
FIG. 22 is a graph illustrating a graph depicting a correlation between X and $Y_{ave}$ of the fifth and sixth comparative examples.
Figure 23:
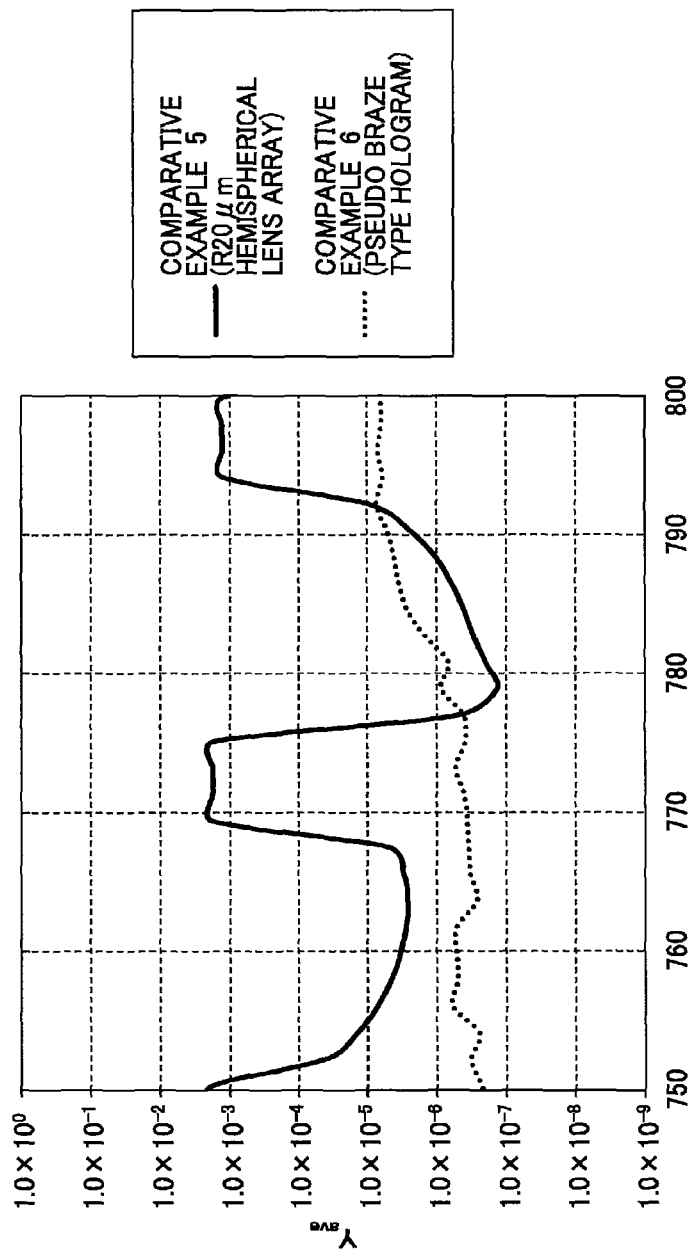
FIG. 23 is a partial enlarged view (1) of FIG. 22.
Figure 24:
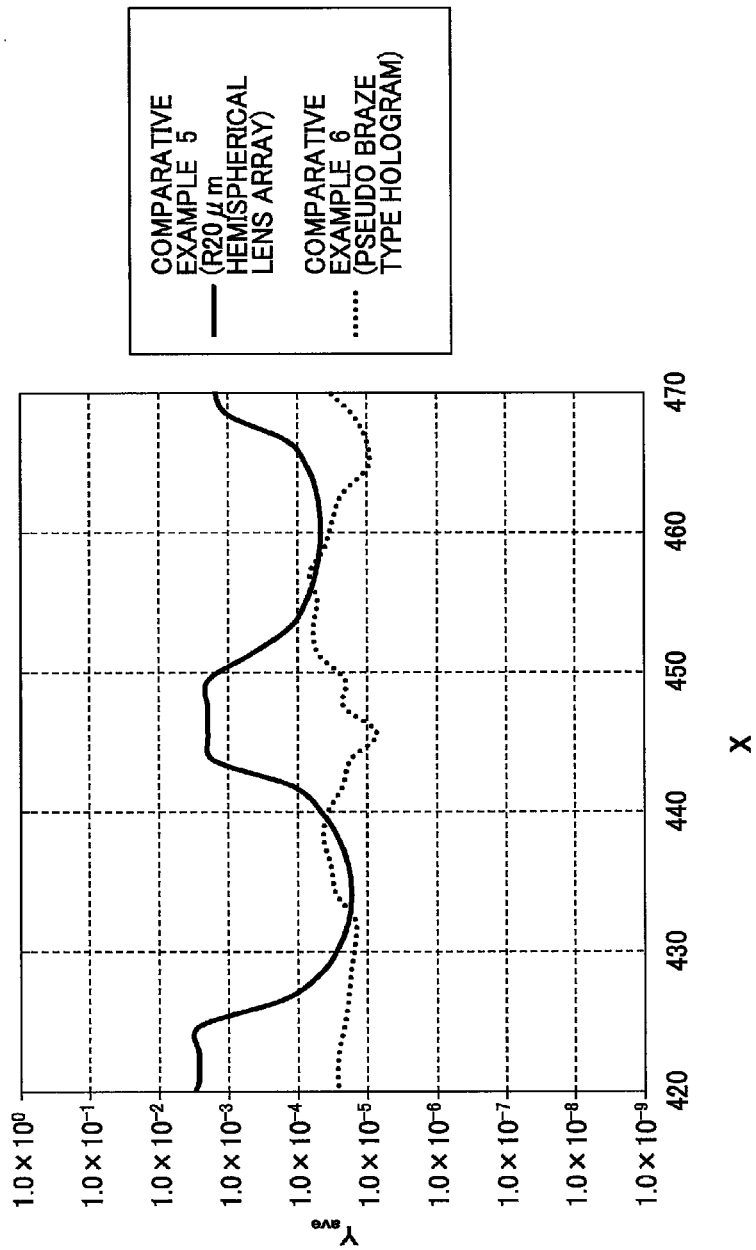
FIG. 24 is a partial enlarged view (2) of FIG. 22.

For comparison with the practical examples, comparative example 5 has a lens array in which the shape of the surface of the first transparent layer 21 is 20 μm as illustrated in FIG. 20, and comparative example 6 has a pseudo-blazed hologram formed to be the shape of the surface of the first transparent layer 21 as illustrated in FIG. 21. FIGS. 22 to 24 are graphs depicting a correlation between X and $Y_{ave}$ of the fifth and sixth comparative examples. Note that FIGS. 23 and 24 are enlarged views illustrating a part of FIG. 22.

Practical Example 27

A video projecting window was manufactured by the same method as practical example 23 except that the thickness of Al of the reflection film was 4 nm.

In the manufactured video projecting window, the random irregularities formed on the surface of the first transparent layer 21 had a roughness average (Ra) of 0.48 μm. The manufactured video projecting window had a transmittance of 75% at the D-line, a reflectivity of 8%, and haze of 3. The background could be clearly seen through the video projecting window, and high resolution video could be seen when the video is projected from a projector.

Practical Example 28

A video projecting window was manufactured by the same method as practical example 23 except that the thickness of aluminum (Al) of the reflection film was 12 nm.

In the manufactured video projecting window, the random irregularities formed on the surface of the first transparent layer 21 had a roughness average (Ra) of 0.48 μm. The manufactured video projecting window had a transmittance of 18% at the D-line, a reflectivity of 30%, and haze of 17. The background could be clearly seen through the video projecting window, and high resolution video could be seen when the video is projected from a projector.

Practical Example 29

A video projecting window was manufactured by the same method as practical example 26 except that the thickness of Al of the reflection film was 4 nm.

In the manufactured video projecting window, the random irregularities formed on the surface of the first transparent layer 21 had a roughness average (Ra) of 0.05 μm. The manufactured video projecting window had a transmittance of 85% at the D-line, a reflectivity of 8%, and haze of 0.6. The background could be clearly seen through the video projecting window, and high resolution video could be seen when the video is projected from a projector.

Practical Example 30

A video projecting window was manufactured by the same method as practical example 26 except that the thickness of aluminum (Al) of the reflection film was 12 nm.

In the manufactured video projecting window, the random irregularities formed on the surface of the first transparent layer 21 had a roughness average (Ra) of 0.05 μm. The manufactured video projecting window had a transmittance of 18% at the D-line, a reflectivity of 51%, and haze of 4. The background could be clearly seen through the video projecting window, and high resolution video could be seen when the video is projected from a projector.

Note that the average roughness (Ra), the PV value, and the median value of the random irregularities of the reflection film 30 on the surface of the first transparent layer 21 in practical examples 23 to 30 were the same as those of the first transparent layer 21.

With the video projecting window structure according to the above-described embodiments of the present invention, high visibility of a projected video can be achieved without degrading the visibility of a background image that can be seen through the video projecting window structure. Further, with the method for manufacturing a video projecting structure, a video projecting window structure achieving high visibility of a projected video without degrading the visibility of a background image that can be seen through the video projecting window structure can be precisely and inexpensively provided.

Although embodiments of a video projection structure, a video projection method, and a video projection window have been described above, the present invention is not limited to the above-described embodiments. Variations and modifications may be made without departing from the scope of the present invention.

The invention claimed is:

1. An image projecting structure comprising:
a substrate having a visible light transmittance greater than or equal to 5% and less than or equal to 90%, a reflectivity greater than or equal to 5% and less than or equal to 70%, and a front haze less than or equal to 20, wherein in a case where light is incident on a surface of the substrate at an angle of 45°, an intensity ratio of a light scattering rearward in a direction normal to the substrate to a light scattering frontward in the direction normal to the substrate is greater than or equal to 0.8.

2. The image projecting structure as claimed in claim 1, wherein the substrate has a rear haze greater than or equal to 5.

3. The image projecting structure as claimed in claim 1, wherein in a case where light is incident on a surface of the substrate at an angle of 45°, a value obtained by dividing the intensity ratio of the light scattering rearward in the direction normal to the substrate to the light scattering frontward in the direction normal to the substrate by the front haze is greater than or equal to 0.1.

4. The image projecting structure as claimed in claim 1, wherein the substrate comprises:
a first transparent layer having a surface on which random irregularities are formed;
a reflection layer formed on the surface of the first transparent layer; and
a second transparent layer formed on the reflection layer.

5. The image projecting structure as claimed in claim 4, wherein the first transparent layer and the second transparent layer are transparent resin layers.

6. The image projecting structure as claimed in claim 4, wherein an average roughness (Ra) of the random irregularities of the first transparent layer satisfies 0.01 μm≤$Ra$≤20 μm, and wherein a maximum value of a Point-to-Valley (PV) of the random irregularities satisfies $PV$≤50 μm.

7. The image projecting structure as claimed in claim 6, wherein the average roughness (Ra) of the random irregularities of the reflection film satisfies 0.01 μm≤$Ra$≤20 μm, and wherein the maximum value of a Peak-to-Valley (PV) of the random irregularities satisfies $PV$≤50 μm.

8. The image projecting structure as claimed in claim 4, wherein in a case where $c_k$, $\omega_k$, Y, X, and $Y_{ave}$ satisfy Equations 1 to 5 when X is greater than or equal to 20, Equation 6 is satisfied,
wherein Equation 1 is $$c_k = c(\omega_k) = \frac{1}{N}\sum_{n=0}^{N-1} \exp\left(\frac{4\pi n z(x_n)}{\lambda}\right)\exp(-i\omega_k n),$$

wherein N represents a positive integer, n represents an integer from 0 to N−1, $x_n$ represents N number of coordinates having constant intervals on a plane parallel to a main plane of the first transparent layer, wherein coordinate $x_0$ is zero and coordinate $x_N$ is xN, $z(x_n)$ represents a height of irregularities at the coordinate $x_n$, k represents a value in which a reciprocal of k multiplied with xN is a width of the irregularities in an in-plane direction of the first transparent layer, λ represents a wavelength of incident light, and i represents an imaginary unit;

wherein

Equation 2 is $$\omega_k = \frac{2\pi}{N}k,$$

wherein Equation 3 is $$Y=|c_k|^2$$

wherein Equation 4 is $$X=kx_N/N$$

wherein Equation 5 is $$Y_{ave} = \frac{1}{6}\int_X^{X+6} Y(X)dX,$$

wherein Equation 6 is $$\frac{0.01}{X^2} < Y_{ave} < \frac{0.01}{X} + 10^{-0.005\,X+1}.$$

9. The image projecting structure as claimed in claim 4, wherein the reflection layer comprises aluminum or silver, wherein the reflection layer has a thickness of from 1 nm to 100 nm.

10. The image projecting structure as claimed in claim 4, wherein a difference of refractive indices between the first transparent layer and the second transparent layer is less than or equal to 0.1.

11. The image projecting structure as claimed in claim 4, wherein an aspect ratio of the random irregularities formed on the surface of the first transparent layer is less than or equal to 0.5.

12. The image projecting structure as claimed in claim 4, wherein an inclination angle of the random irregularities is less than or equal to 45 degrees.

13. The image projecting structure as claimed in claim 4, wherein a median value of a height of the random irregularities is greater than or equal to 0.005 μm and less than or equal to 50 μm.

14. A image projecting method comprising:
projecting an image to the image projecting structure of claim 1 from a projector such that the image reflected by the image projecting structure is visually recognized.

15. An automobile window comprising:
the image projecting structure of claim 1.

16. A method for manufacturing an image projecting structure, the method comprising:
applying a resin material on a surface of a transparent substrate;
placing a mold on the resin material, the mold having a surface on which random irregularities are formed, the mold being placed in a manner that the surface is placed on the resin material;
curing or solidifying the resin material to form a first transparent layer which has a surface on which random irregularities are formed;
peeling the first transparent layer from the mold;
forming a reflection layer on the surface of the first transparent layer;
applying another resin material on the reflection layer and curing or solidifying the another resin material to form a second transparent layer, such that the image projecting structure of claim 1 is manufactured.

17. The method as claimed in claim 16, wherein the mold comprises a resin film having a surface on which random irregularities are formed.

18. The method as claimed in claim 16, wherein the resin material is a photocurable resin.

* * * * *